(12) United States Patent
Nakano et al.

(10) Patent No.: US 9,586,767 B2
(45) Date of Patent: Mar. 7, 2017

(54) CONVEYING GAP ADJUSTING APPARATUS

(71) Applicant: Kabushiki Kaisha Toshiba, Minato-ku (JP)

(72) Inventors: Toshiki Nakano, Kawasaki (JP); Yusuke Usami, Ota (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/068,020

(22) Filed: Mar. 11, 2016

(65) Prior Publication Data
US 2016/0264363 A1 Sep. 15, 2016

(30) Foreign Application Priority Data

Mar. 12, 2015 (JP) ................................ 2015-049374
Dec. 14, 2015 (JP) ................................ 2015-243340

(51) Int. Cl.
*B65G 47/26* (2006.01)
*B65G 47/31* (2006.01)
(Continued)

(52) U.S. Cl.
CPC ............ *B65G 47/31* (2013.01); *B65G 13/02* (2013.01); *B65G 43/08* (2013.01); *B65G 43/10* (2013.01); *B65H 29/125* (2013.01); *B65H 43/00* (2013.01); *B65G 2811/0673* (2013.01); *B65H 2301/4452* (2013.01); *B65H 2511/11* (2013.01); *B65H 2511/13* (2013.01); *B65H 2511/22* (2013.01); *B65H 2513/11* (2013.01); *B65H 2701/1311* (2013.01); *B65H 2701/1313* (2013.01)

(58) Field of Classification Search
CPC ........ B65G 43/00; B65G 47/26; B65G 47/31; B65G 2811/0673; B07C 5/00; B65H 7/02; B65H 2220/01

USPC ................................ 198/460.1, 461.1, 461.2
See application file for complete search history.

(56) References Cited

U.S. PATENT DOCUMENTS 4,518,075 A * 5/1985 Aykut .................... B65G 47/31
                                                                                 198/460.1
5,924,546 A * 7/1999 Funaya ................ B65G 47/256
                                                                                 198/460.1
(Continued)

FOREIGN PATENT DOCUMENTS

JP        2009-220939        10/2009

OTHER PUBLICATIONS

Extended European Search Report issued on Aug. 3, 2016 in European Patent Application No. 16159802.4.

*Primary Examiner* — James R Bidwell
(74) *Attorney, Agent, or Firm* — Oblon, McClelland, Maier & Neustadt, L.L.P.

(57) ABSTRACT

According to one embodiment, a conveying apparatus includes: a conveyor configured to convey a conveyed item at a predetermined speed; a first gap detector provided midway in the conveyor, the first gap detector being configured to detect a first preceding gap between the conveyed item and a preceding conveyed item that is conveyed immediately before the conveyed item, and a following gap between the conveyed item and a following conveyed item that is conveyed immediately behind the conveyed item; at least two speed adjusters provided midway in the conveyor downstream from the first gap detector, the speed adjusters being configured to adjust a conveying speed of the conveyed item.

20 Claims, 18 Drawing Sheets

(51) Int. Cl.
*B65H 29/12* (2006.01)
*B65H 43/00* (2006.01)
*B65G 13/02* (2006.01)
*B65G 43/08* (2006.01)
*B65G 43/10* (2006.01)

(56) References Cited

U.S. PATENT DOCUMENTS

| | | | |
|---|---|---|---|
| 6,023,034 A | 2/2000 | Nakajima et al. | |
| 6,629,593 B2 * | 10/2003 | Zeitler | B65G 43/08 198/460.1 |
| 7,191,895 B2 * | 3/2007 | Zeitler | B65G 43/08 198/460.1 |
| 7,631,747 B2 * | 12/2009 | Zeitler | B65G 43/08 198/460.1 |
| 7,681,712 B2 * | 3/2010 | Hara | B65G 43/08 198/461.1 |
| 8,714,342 B2 * | 5/2014 | Halloran | H01L 21/67173 198/460.1 |
| 2006/0157319 A1 | 7/2006 | Sato | |

* cited by examiner

| ΔL | TARGET SPEED | CONTROL TIME |
|---|---|---|
|  |  |  |
| ⋮ | ⋮ | ⋮ |
|  |  |  |

CONVEYING GAP ADJUSTING APPARATUS

CROSS-REFERENCE TO RELATED APPLICATION

This application is based upon and claims the benefit of priority from Japanese Patent Applications No. 2015-049374, filed on Mar. 12, 2015 and No. 2015-243340, filed on Dec. 14, 2015; the entire contents of which are incorporated herein by references.

FIELD

Embodiments described herein relate generally to a conveying apparatus.

BACKGROUND

Conventionally, conveying apparatuses are known that sort conveyed items such as postal items according to a predetermined classification. This type of conveying apparatus separates and takes out the conveyed items one by one from a take-out unit, conveys these items spaced apart from one another with a conveyor belt or the like, and collects the items in a collecting unit. Here, there are individual differences in the thickness of conveyed items. Therefore, the conveying speed of each item may change depending on these individual differences. When the conveying speed changes in this way, the spacing between conveyed items may become too wide or too narrow. Thus, there is the possibility that during the operation of sorting or collecting the conveyed items, problems occur and a stable collection cannot be achieved.

For this reason, a gap correction device for adjusting the conveying speed of the conveyed items is provided midway in the conveyance of the conveyed items. By adjusting the conveying speed of the conveyed items with this gap correction device, the gap (referred to as "preceding gap" in the following") between a conveyed item whose gaps are to be corrected (also referred to as "conveyed item subject to correction" in the following) and the conveyed item that is conveyed immediately before that conveyed item subject to correction (referred to as "preceding conveyed item" in the following) can be corrected. Moreover, the gap (referred to as "following gap" in the following") between the conveyed item subject to correction and the conveyed item that is conveyed immediately behind that conveyed item subject to correction (referred to as "following conveyed item" in the following) can be corrected.

There may be individual differences in the length as well as the thickness among conveyed items. Here, when providing the gap correction device midway in a conveying path, the interval between the conveyor belt and a gap correction value needs to be determined based on the shortest conveyed item in order to enable delivery of the conveyed items from the conveyor belt to the gap correction device. However, conversely, a long conveyed item may cause a state where a rear end of this conveyed item in the conveying direction is still present on the conveyor belt even when a leading end of the conveyed item in the conveying direction has reached the gap correction device. In this case, the preceding gap and the following gap cannot be corrected, and moreover, there is the possibility that an excessive stress is exerted on the conveyed items, resulting in a decrease in the quality of the conveyed items.

DETAILED DESCRIPTION

Figure 1:
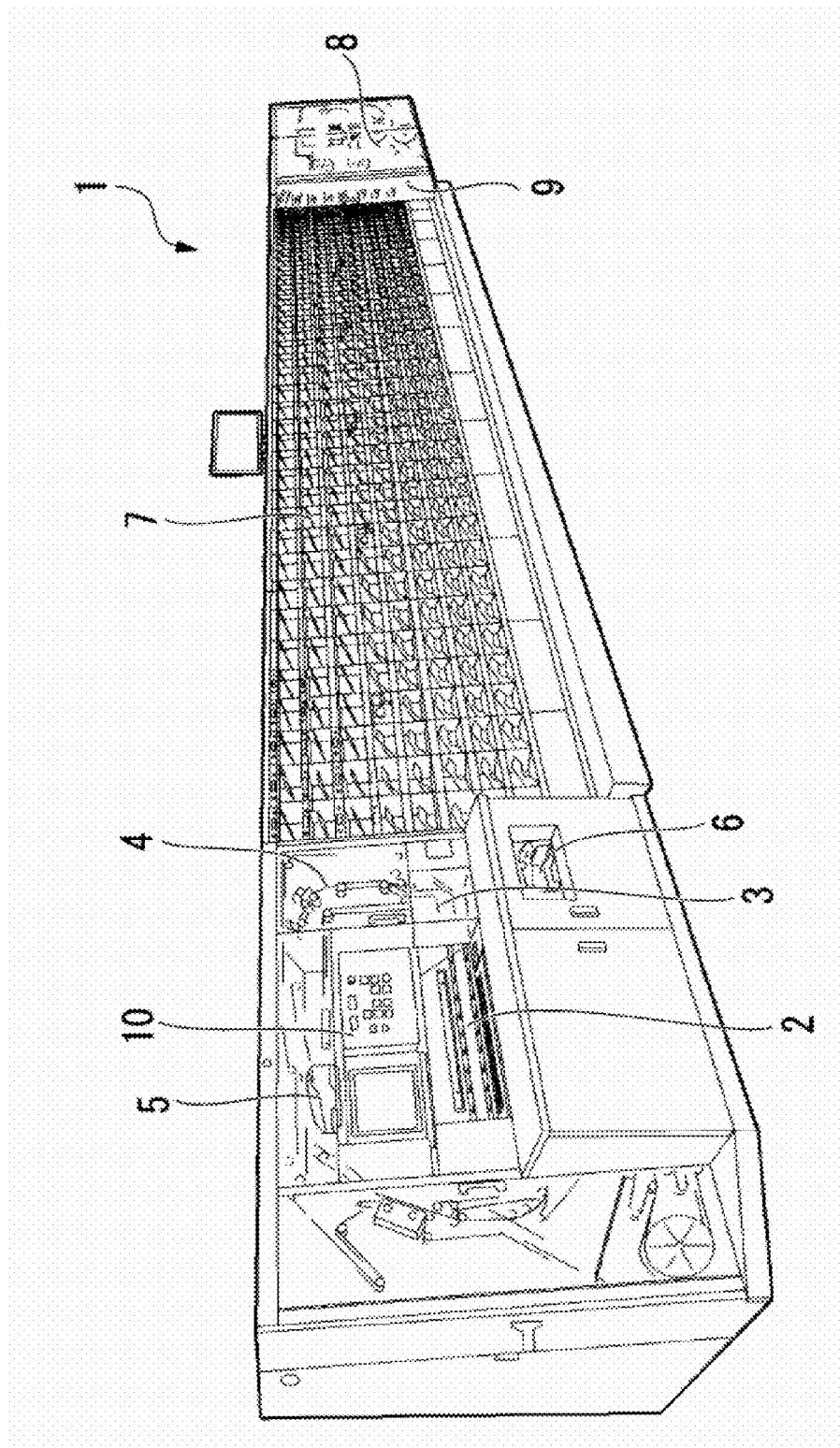
FIG. 1 is a perspective view of a configuration of a conveying device according to a first embodiment.

According to one embodiment, there is provided a conveying apparatus including: a conveyor configured to convey a conveyed item at a predetermined speed; a first gap detector provided midway in the conveyor, the first gap detector being configured to detect a first preceding gap between the conveyed item and a preceding conveyed item that is conveyed immediately before the conveyed item, and a following gap between the conveyed item and a following conveyed item that is conveyed immediately behind the conveyed item; at least two speed adjusters provided midway in the conveyor downstream from the first gap detector, the speed adjusters being configured to adjust a conveying speed of the conveyed item; at least two conveyed item position detectors, one of the conveyed item position detectors being provided for each of the speed adjusters, the conveyed item position detectors being configured to detect a position that a front end position of the conveyed item in the conveying direction has reached and a position that a rear end position of the conveyed item in the conveying direction has reached with respect to the corresponding speed adjuster; and a controller configured to individually control a conveying speed of the conveyed item at each of the speed adjusters based on a result of the detection performed by the first gap detector and a result of the detection performed by the conveyed item position detectors.

Referring to the drawings, the following is an explanation of a conveying apparatus according to one embodiment.

First Embodiment

FIG. 1 is a perspective view of the configuration of a conveying device 1 according to a first embodiment. As shown in FIG. 1, this conveying apparatus 1 is for conveying postal matters, which can be e.g. sheet-shaped, and includes a supply unit 2, a take-out unit 3, a conveying unit 4, a first eliminating/collecting unit 5, a second eliminating/collecting unit 6, a sorting/collecting unit 7, a label attaching device 8, a gap correction unit 9 and a control device 10.

The supply unit 2 holds a plurality of conveyed items gathered by an operator, and stacked in a predetermined orientation. The supply unit 2 supplies the plurality of conveyed items to the take-out unit 3, which is located at its leading end in the stacking direction, by moving the conveyed items in the stacking direction. The conveyed items may include items such as postcards and letters, but also flat items of a certain thickness, such as mail envelopes, for example. The conveyed items have sorting information written or printed onto a first surface.

The take-out unit 3 takes out the conveyed items that are supplied by the supply unit 2 and located at the front-most end in the stacking direction one by one and feeds them to the conveying unit 4 located in the take-out direction. The conveying unit 4 is constituted by a plurality of conveyor belts 4a and a plurality of conveying rollers 18 (both shown in FIG. 2). Moreover, by driving the conveyor belts 4a, the conveying unit 4 conveys the conveyed items in the direction in which the conveyor belts 4a are laid out.

The first eliminating/collecting unit 5 and the second eliminating/collecting unit 6 are provided in the conveying unit 4. The first eliminating/collecting unit 5 and the second eliminating/collecting unit 6 collect any conveyed items to be eliminated out of the plurality of conveyed items taken out by the take-out unit 3. The first eliminating/collecting unit 5 detects conveyed items whose thickness exceeds a predetermined thickness as well as conveyed items containing foreign matter and collects/recovers such detected conveyed items. The second eliminating/collecting unit 6 detects conveyed items whose conveying orientation deviates from a predetermined orientation and collects/recovers such detected conveyed items.

The sorting/collecting unit 7 is connected via a conveying path (not shown) or the like to the label attaching device 8 and the gap correction unit 9. More specifically, the sorting/collecting unit 7 is directly connected to the gap correction unit 9 by a conveyor belt (not shown) that detours the label attaching device 8, and is also indirectly connected to the gap correction unit 9 by a branched conveying path (not shown) in which the label attaching device 8 is provided. The sorting/collecting unit 7 acquires sorting information assigned to conveyed items, and information regarding labels that are attached to the conveyed items by the label attaching device 8. The sorting/collecting unit 7 sorts and collects the conveyed items in accordance with the sorting information acquired from the conveyed items or the label information. The sorting/collecting unit 7 sorts and collects conveyed items to which labels have not been attached by the label attaching device 8, independently of the eliminating/collecting unit for collecting and recovering conveyed items to be eliminated at the label attaching device 8.

The label attaching device 8 is arranged in the branched conveying path (not shown) between the gap correction unit 9 and the sorting/collecting unit 7. The label attaching device 8 attaches a label on which information, which is new with respect to the sorting information provided in advance on a first surface of the conveyed item (e.g., correction information or additional information for the sorting information), is written to each conveyed item.

The gap correction unit 9 is arranged so as to oppose the end (downstream end) of the conveying unit 4 in the conveying direction. The gap correction unit 9 detects the gaps preceding and following a conveyed item before and after the conveyed item in the conveying direction and sets the conveying speed of the conveyed item such that the detected gaps have values within a predetermined value range (i.e., performs a gap correction). The output end (downstream end) of the gap correction unit 9 is connected to the sorting/collecting unit 7 by a downstream conveying unit 14 (see FIG. 2).

It should be noted that the configuration of the downstream conveying unit 14 is basically the same as the configuration of the conveying unit 4. That is to say, the downstream conveying unit 14 is constituted by a plurality of conveyor belts 14a and a plurality of conveying rollers 19 (both shown in FIG. 2). Moreover, by driving the conveyor belts 14a, the conveyed items are conveyed along the direction in which the conveyor belts 14a are laid out. Moreover, the conveying speeds of the conveying unit 4 and the downstream conveying unit 14 are set to the same speed (predetermined speed).

Figure 2:
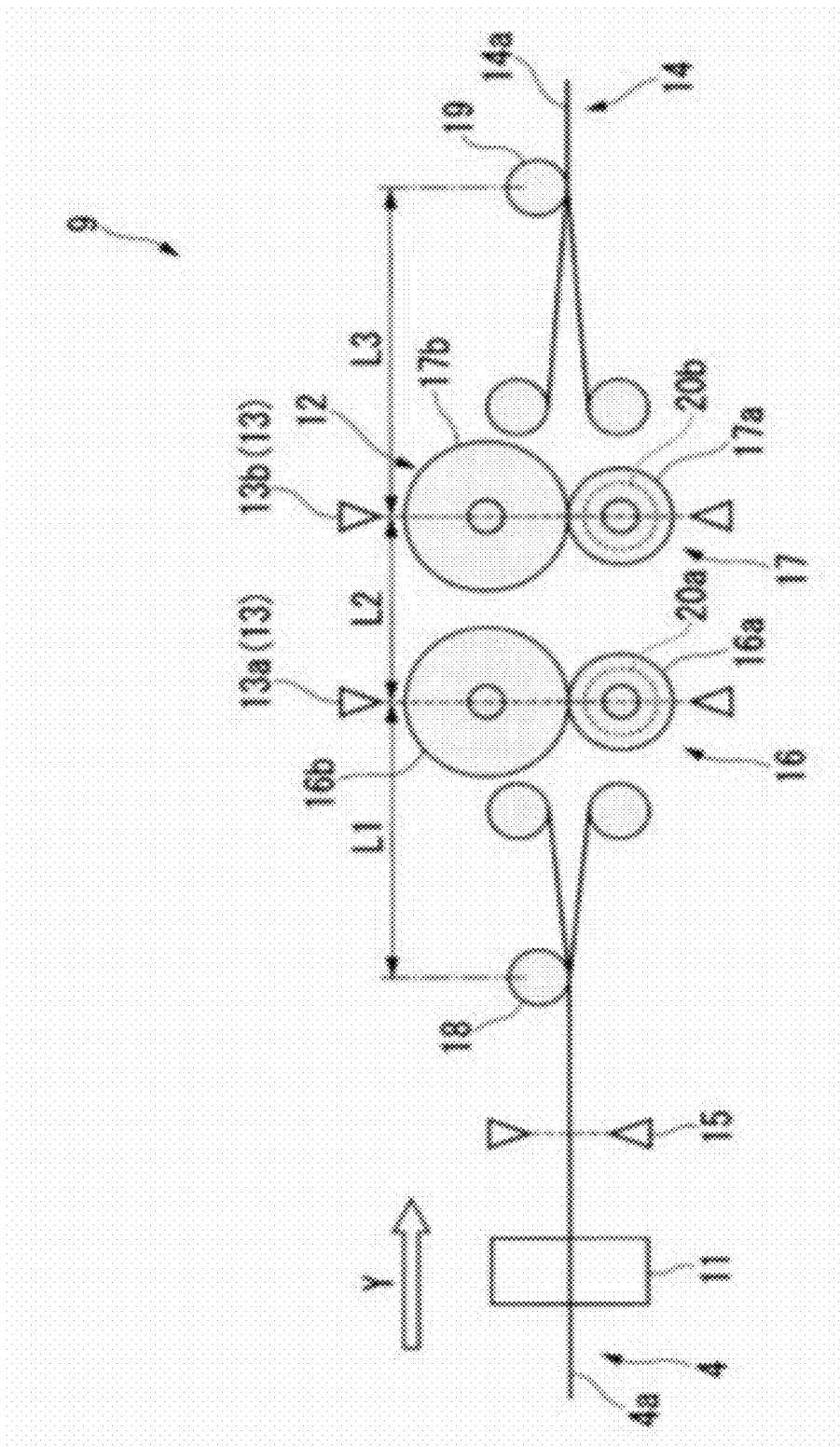
FIG. 2 is a schematic diagram showing a gap correction unit according to the first embodiment.
Figure 3:
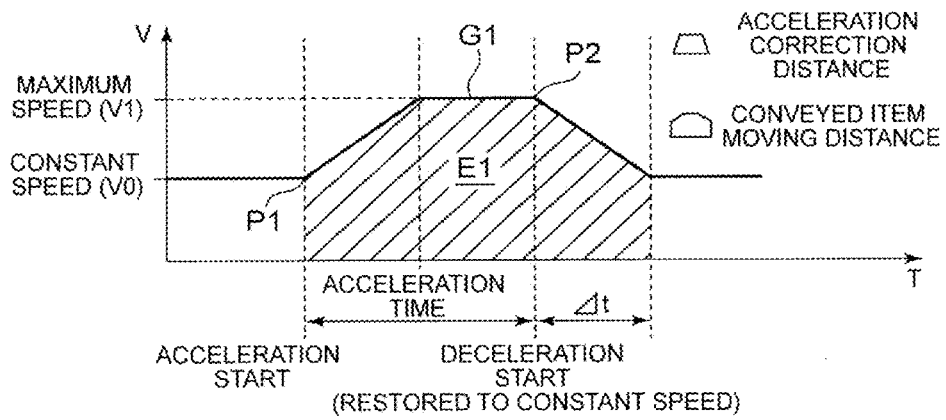
FIG. 3 is a graph illustrating a change in a conveying speed according to the first embodiment.

Referring to FIGS. 2 and 3, the following is a detailed explanation of the gap correction unit 9. FIG. 2 is a schematic diagram showing the gap correction unit 9 according to the first embodiment. As shown in FIG. 2, the gap correction unit 9 is mainly constituted by a gap detecting unit (first gap detecting unit) 11 that detects a gap preceding a conveyed item (first preceding gap) and a gap following the conveyed item, a speed adjusting unit 12 that adjusts the speed of a conveyed item, and a conveyed item position detecting unit 13 that detects the position of a conveyed item with respect to this speed adjusting unit 12.

The gap detecting unit 11 is provided midway in the conveying unit 4. The gap detecting unit 11 is constituted by a photoelectric sensor or the like, for example. The gap detecting unit 11 detects not only the gap preceding and the gap following a conveyed item but also the length of the conveyed item in the conveying direction Y (hereinafter referred to simply as "conveyed item length"), the thickness and the weight of the conveyed item. These detection results are output as signals to the control device 10 and stored in a memory or the like of this control device 10. It should be noted that a strain gage or the like may be used for detecting the weight of the conveyed item.

A timing sensor 15 is provided midway in the conveying unit 4 downstream from the gap detecting unit 11 in the conveying direction Y. That is to say, the timing sensor 15 is arranged immediately upstream from the speed adjusting unit 12. The timing sensor 15 is constituted by a transmission photoelectric sensor or the like, for example. The timing sensor 15 detects whether or not a conveyed item has reached a location where this timing sensor 15 is arranged. The result of this detection is output as a signal to the control device 10.

The control device 10 retrieves, based on an output signal from the timing sensor 15, the result of the detection regarding a corresponding conveyed item (conveyed item subject to correction) performed by the gap detecting unit 11 from the memory or the like, and performs drive control for the speed adjusting unit 12 based on this detection result.

The speed adjusting unit 12 includes two adjusting units 16 and 17, namely a first (speed) adjusting unit 16 and a second (speed) adjusting unit 17. These two adjusting units 16 and 17 are arranged in the order of the first adjusting unit 16 and the second adjusting unit 17 from the upstream side in the conveying direction Y. The adjusting units 16 and 17 are provided so as to be paired with drive rollers 16a and 17a, and with driven rollers 16b and 17b, respectively. The adjusting units 16 and 17 convey conveyed items to the downstream conveying unit 14 while holding the conveyed items with the drive rollers 16a and 17a and the driven rollers 16b and 17b.

The drive rollers 16a and 17a are made of a hard rubber material, for example. Drive motors 20a and 20b are connected separately to the drive rollers 16a and 17a, respectively. Therefore, the drive rollers 16a and 17a can be separately driven. The drive motors 20a and 20b are each driven based on an output signal from the control device 10. Thus, the conveying speed of conveyed items to be conveyed to the speed adjusting unit 12 is increased or decreased relative to the conveying speed of the conveying unit 4 and the downstream conveying unit 14, and the gap preceding and the gap following the conveyed item subject to correction are adjusted.

It should be noted that the details of the method by which the speed adjusting unit 12 accelerates/decelerates the conveyed items will be described later. In the following description, the conveying speed will be called a constant speed in some cases. Moreover, in the following description, acceleration and deceleration relative to the conveying speed will be referred to simply as acceleration and deceleration.

On the other hand, the driven rollers 16b and 17b are constituted by an elastically deformable material, such as sponge, and the outer diameter thereof is set to be larger than that of the driving rollers 16a and 17a. The outer circumferential surfaces of the driven rollers 16b and 17b are arranged to come in contact with the outer circumferential surfaces of the driving rollers 16a and 17a, respectively. By configuring the driven rollers 16b and 17b in this manner, conveyed items can be held reliably by the two rollers of each of the adjusting units 16 and 17, namely the rollers 16a, 16b, 17a, and 17b even if conveyed items having different thicknesses are conveyed by the adjusting units 16 and 17, and no excessive stress will be exerted on the conveyed items. That is to say, if a conveyed item is thick, the driven rollers 16b and 17b will elastically deform in accordance with its thickness, so that it can be prevented that an excessive stress is exerted on that conveyed item.

The driving rollers 16a and 17a and the driven rollers 16b and 17b that are configured this way are arranged such that their outer circumferential surfaces at the location where they come in contact with each other are positioned in the direction in which the conveyor belts 4a of the conveying unit 4 and the conveyor belts 14a of the downstream conveying unit 14 are laid out (conveying direction).

The first adjusting unit 16 and the second adjusting unit 17 are each provided with the conveyed item position detecting unit 13. That is to say, the first adjusting unit 16 is provided with a first position detecting unit 13a of the conveyed item position detecting unit 13 so as to correspond to the rotation center position of the rollers 16a and 16b. The second adjusting unit 17 is provided with a second position detecting unit 13b of the conveyed item position detecting unit 13 so as to correspond to the rotation center position of the rollers 17a and 17b.

The position detecting units 13a and 13b are each constituted by a transmission photoelectric sensor, for example. The first position detecting unit 13a detects respective time points when the front end position and the rear end position of a conveyed item in the conveying direction reach the rotation center position of the rollers 16a and 16b of the first adjusting unit 16. On the other hand, the second position detecting unit 13b detects respective time points when the front end position and the rear end position of a conveyed item in the conveying direction reach the rotation center position of the rollers 17a and 17b of the second adjusting unit 17. These detection results are output as signals to the control device 10. The control device 10 performs drive control for the drive motors 20a and 20b while also reflecting the detection results of the position detecting units 13a and 13b in the drive control.

Here, assuming that, with respect to the conveying direction Y, L1 is the distance between the rotation center position of the rollers 16a and 16b of the first adjusting unit 16 and the rotation center position of the conveying roller 18 arranged immediately upstream from the first adjusting unit 16, L2 is the distance between the rotation center position of the rollers 16a and 16b of the first adjusting unit 16 and the rotation center position of the rollers 17a and 17b of the second adjusting unit 17, Lmin is the length of a shortest conveyed item, which is a conveyed item having a shortest length, Lmax is the length of a longest conveyed item, which is a conveyed item having a longest length, and a1 is the distance with which the shortest conveyed item that has been carried past the conveying roller 18 arranged immediately upstream from the first adjusting unit 16 can be delivered to the first adjusting unit 16, then the distances L1 and L2 are set so as to satisfy:

$$a1 \geq L1 \geq L\text{min} \quad (1)$$

$$L2 < L\text{min} \quad (2)$$

$$L1 + L2 \geq L\text{max} \quad (3)$$

It is thereby possible to reliably deliver the conveyed items from the conveying unit 4 to the first adjusting unit 16 regardless of the length of the conveyed items. It is also possible to reliably deliver the conveyed items from the first adjusting unit 16 to the second adjusting unit 17.

Here, a detailed description will be given of the distance a1 at which the shortest conveyed item that has been carried past the conveying roller 18 arranged immediately upstream from the first adjusting unit 16 can be delivered to the first adjusting unit 16. Once the shortest conveyed item is carried past the conveying roller 18, it is possible to let the shortest conveyed item, which is lightweight, fly for a certain distance before the shortest conveyed item reaches the first adjusting unit 16. At this time, the shortest conveyed item receives air resistance after being shot from the conveying roller 18, and may be shifted. The distance a1 is a (e.g., maximum) distance over which the shortest conveyed item in this shifted state can be held and drawn in by the two rollers 16a and 16b of the first adjusting unit 16. Therefore, a1 can be expressed as a1=Lmin+δ (δ denotes the distance when in a state where the shortest conveyed item is completely flying). It should be noted that δ can be derived from the result of an experiment or the like.

Also, assuming that L3 is the distance between the rotation center position of the rollers 17a and 17b of the second adjusting unit 17 and the rotation center position of the conveying roller 19 arranged immediately downstream from the second adjusting unit 17, a2 is the (e.g., maximum) distance over which the shortest conveyed item that has been carried past the second adjusting unit 17 can be delivered to the conveying roller 19 arranged immediately downstream from this second adjusting unit 17, and Dmax is the conveyed item maximum moving distance by which a conveyed item moves when this conveyed item is maximally accelerated at the second adjusting unit 17, then the distance L3 is set so as to satisfy:

$$a2 \geq L3 \geq Dmax \qquad (4)$$

It is thereby possible to reliably deliver the conveyed items from the second adjusting unit 17 to the downstream conveying unit 14, and prevent an excessive stress from being exerted on a conveyed item in the process of delivering this conveyed item from the second adjusting unit 17 to the downstream conveying unit 14. The following is a detailed description thereof.

Initially, the distance a2 is obtained in a manner similar to the above-described distance a1, and a description thereof will be omitted. Next, the conveyed item maximum moving distance Dmax will be described. Here, in the case of accelerating a conveyed item using the second adjusting unit 17, the conveying speed of this conveyed item needs to be restored to the constant speed before the conveyed item reaches the conveying roller 19. This is because it is necessary to consider the case where, at the time point when the front end of the conveyed item in the conveying direction reaches the conveying roller 19, the rear portion of the conveyed item in the conveying direction is still held by the two rollers 17a and 17b of the second adjusting unit 17. That is to say, an excessive stress will be exerted on the conveyed item if a difference in the speed occurs between the conveying roller 19 and the two rollers 17a and 17b in a state where the conveyed item is in contact with both the conveying roller 19 and the two rollers 17a and 17b of the second adjusting unit 17. Therefore, the distance L3 needs to be set to the conveyed item largest moving distance Dmax or smaller.

Referring to FIG. 3, the conveyed item maximum moving distance Dmax will be described in more detail. FIG. 3 is a graph showing a change in the conveying speed (V) with the vertical axis indicating the conveying speed (V) of a conveyed item at the speed adjusting unit 12, and the horizontal axis indicating the time (T). Assuming that the constant speed is V0 and the maximum speed of the conveyed item at the speed adjusting unit 12 is V1, the change in the conveying speed (V) from the start of acceleration of the conveyed item (P1) to the start of deceleration (P2) and then to restoration to the constant speed can be expressed by the graph shown in FIG. 3, where acceleration time and deceleration time of the drive motors 20a and 20b are also taken into consideration. Here, the conveyed item moves by the area of a region E1 (the area of the hatched portion) in FIG. 3 from when the conveyed item is accelerated until the conveying speed is restored to the constant speed. This area indicates the conveyed item maximum moving distance Dmax.

It should be noted that this embodiment employs a configuration in which the acceleration time is set to be fixed, and the preceding gap and the following gap are corrected by changing the speed after the acceleration (see the later description of the operation of the gap correction unit 9 for the details). However, the configuration is not limited thereto, and a configuration in which the acceleration time is changed in accordance with the gap preceding and the gap following the conveyed item is also possible. Although not particularly shown in FIG. 3, the idea in the case of acceleration also applies to the case of deceleration. This embodiment employs a configuration in which the deceleration time is set to be fixed, and the preceding gap and the following gap are corrected by changing the speed after the deceleration. However, the configuration is not limited thereto, and a configuration in which the deceleration time is changed in accordance with the gap preceding and the gap following the conveyed item is also possible.

Figure 4:
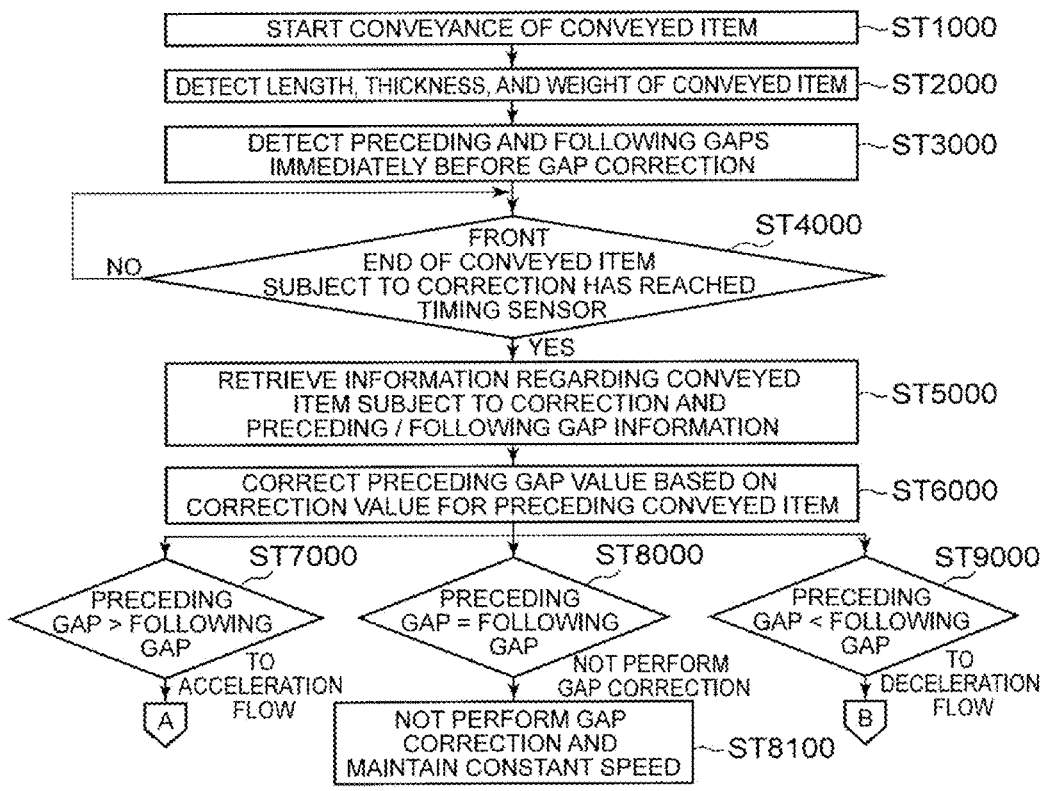
FIG. 4 is a flowchart illustrating the operation of the gap correction unit according to the first embodiment.
Figure 5:
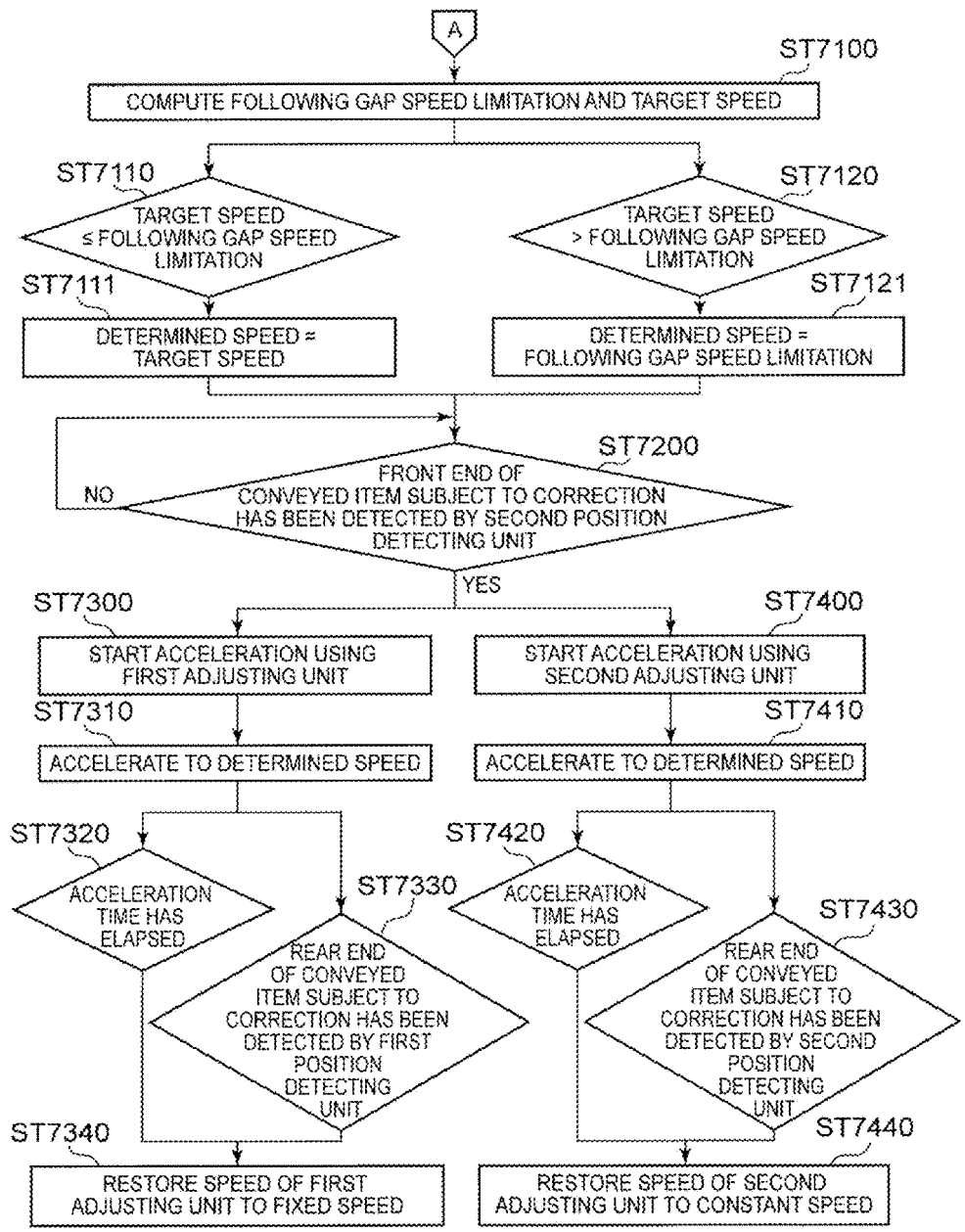
FIG. 5 is a flowchart illustrating the operation of the gap correction unit according to the first embodiment.

Next, referring to FIGS. 1 to 10, a detailed description will be given of a method for adjusting the gap preceding and the gap following a conveyed item using the gap correction unit 9. FIGS. 4 to 8 are flowcharts illustrating the operation of the gap correction unit 9 according to the first embodiment. As shown in FIGS. 1, 2, and 4, initially, the conveyed items are sent out one by one to the conveying unit 4 via the supply unit 2 and the take-out unit 3 (step ST1000). When each conveyed item passes through the gap detecting unit 11, the length, thickness, and weight of the conveyed item are detected by this gap detecting unit 11 (step ST2000). Furthermore, the gap preceding and the gap following each conveyed item are detected by the gap detecting unit 11 (step ST3000).

Subsequently, it is determined by the timing sensor 15 whether or not the leading end of the conveyed item in the conveying direction has reached this timing sensor 15 (step ST4000). If the result of the determination in step ST4000 is "Yes", i.e., if the leading end of the conveyed item in the conveying direction has reached the timing sensor 15, the control device 10 retrieves the result of the detection that has been performed on the conveyed item reaching the timing sensor 15 (conveyed item subject to correction) by the gap detecting unit 11, from the memory or the like (step ST5000).

The control device 10 also corrects the value of the preceding gap acquired in step ST5000 based on a correction value for the conveyed item that is conveyed immediately before the conveyed item subject to correction (step ST6000). The operation in step ST6000 will be described below in more detail.

That is to say, when the information regarding the preceding gap is acquired by the gap detecting unit 11, none of the conveyed items has undergone gap correction. However, at the time point when the conveyed item subject to correction reaches the timing sensor 15, there is the possibility that the gap preceding and the gap following the preceding conveyed item have been corrected by the speed adjusting unit 12. For this reason, there is the possibility that the value of the gap preceding the conveyed item subject to correction is different between the time point when the conveyed item reaches the gap detecting unit 11 and the time point when the conveyed item reaches the timing sensor 15. Therefore, the control device 10 performs the operation in step ST6000.

Subsequently, the control device 10 compares the value of the preceding gap and the value of the following gap that are obtained through the operation in step ST6000, and determines whether the value of the preceding gap is larger than the value of the following gap (step ST7000), or the value of the preceding gap is the same as the value of the following gap (step ST8000), or the value of the preceding gap is smaller than the value of the following gap (step ST9000).

If the value of the preceding gap is the same as the value of the following gap (step ST8000), the gap correction does not need to be performed, and accordingly, the speed adjusting unit 12 of the gap correction unit 9 continues to convey the conveyed item subject to correction at the constant speed (step ST8100).

On the other hand, if the value of the preceding gap is larger than the value of the following gap (step ST7000), the conveyed item subject to correction needs to be accelerated at the speed adjusting unit 12 to reduce the difference between the value of the preceding gap and the value of the following gap. When performing this accelerating operation, the control device 10 initially computes a following gap speed limitation (conveying speed upper limit value) and a target conveying speed (target speed) (step ST7100). The target conveying speed mentioned here refers to a calculated speed after acceleration that is necessary for converging the value of the preceding gap and the value of the following gap within a predetermined value range.

Figure 9A:
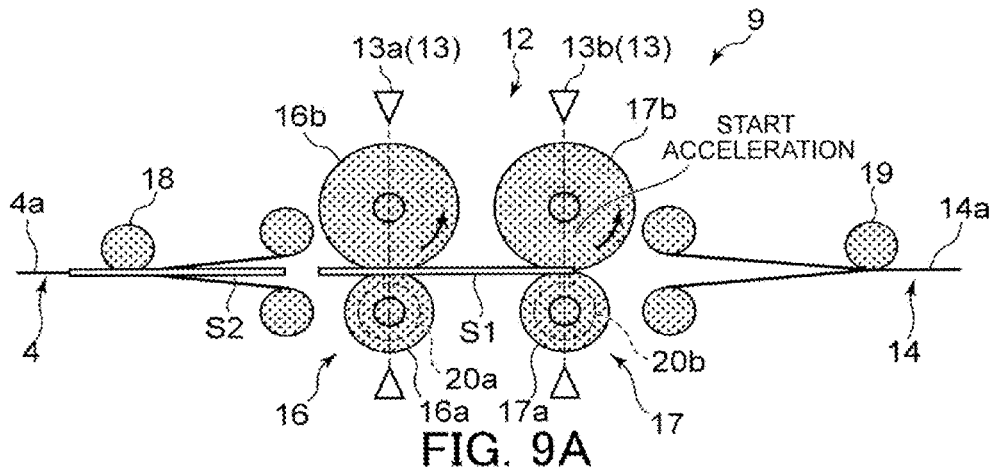
FIGS. 9A to 9C are illustrative diagrams showing a case of accelerating a conveyed item according to the first embodiment.
Figure 9B:
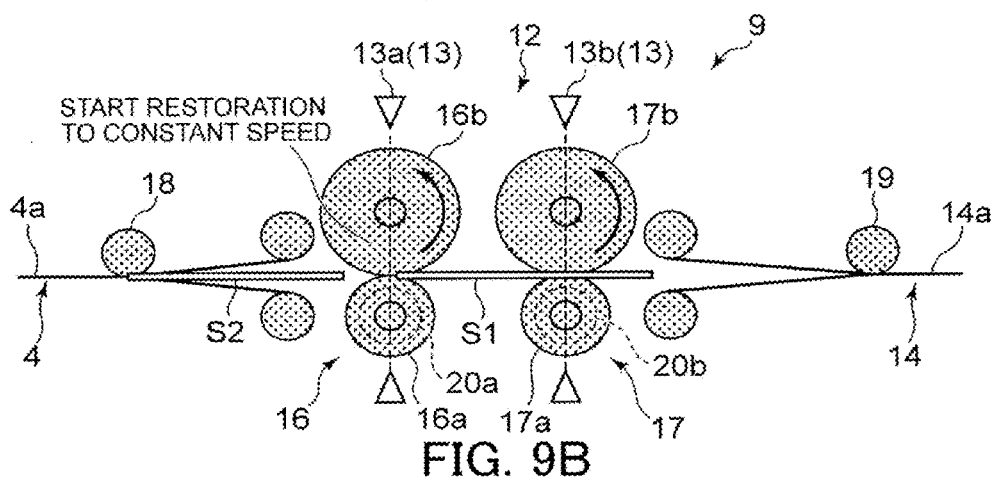
Figure 9C:
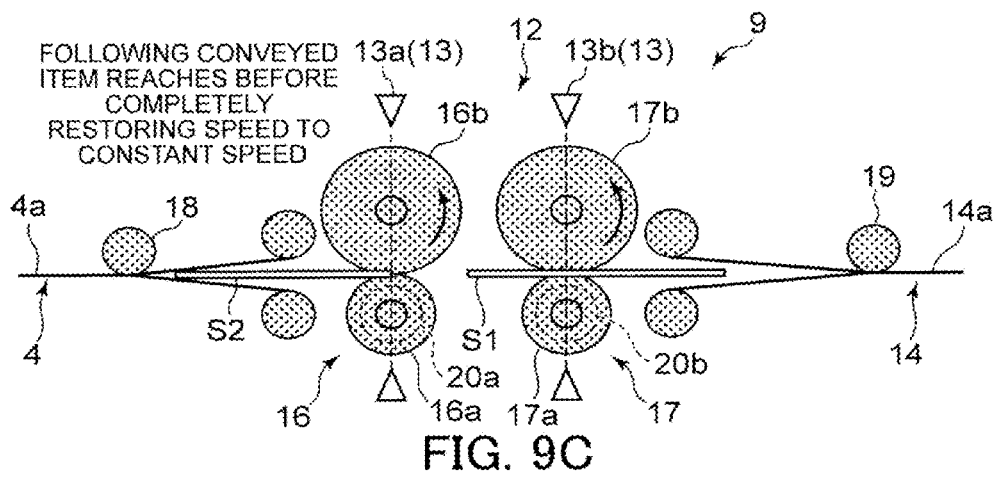

Here, referring to FIG. 9, a detailed description will be given of the following gap speed limitation in the case of accelerating the conveyed item subject to correction. FIGS. 9A to 9C are illustrative diagrams showing the case of accelerating a conveyed item subject to correction S1 at the speed adjusting unit 12 according to the first embodiment, and illustrate the behavior of the speed adjusting unit 12 and conveyed items S1 and S2 at respective timings. Initially, as shown in FIG. 9A, in the case of accelerating the conveyed item subject to correction, at the speed adjusting unit 12, the acceleration using the adjusting units 16 and 17 is started when the second position detecting unit 13b provided in the second adjusting unit 17 detects that the front end position of the conveyed item subject to correction S1 in the conveying direction has reached the rotation center position of the rollers 17a and 17b. Then, as shown in FIG. 9B, the deceleration is started after a predetermined acceleration time elapses, and the speed of the adjusting units 16 and 17 is restored to the constant speed.

Here, as shown in FIG. 3, the acceleration time of the adjusting units 16 and 17 is from the start of acceleration (P1) to the start of deceleration (P2), but it takes time for the adjusting units 16 and 17 to be actually restored to the constant speed after the start of deceleration (P2). It should be noted that this time will be deemed to be restoration time Δt. As shown in FIG. 9C, if the following conveyed item S2 reaches the first adjusting unit 16 during the period of the restoration time Δt, it is difficult to appropriately perform gap correction for the following conveyed item S2.

This situation is more likely to occur as the interval between the conveyed item subject to correction S1 and the following conveyed item S2 (following gap) is shorter. For this reason, a limit needs to be imposed on the accelerated speed in accordance with the length of the following gap. This speed limitation is the following gap speed limitation in the case of accelerating the conveyed item subject to correction S1. Although the idea of the following gap speed limitation has been described by taking the restoration time Δt as an example, the same applies to the case where consideration is made based on the distance that is necessary for the speed of the adjusting units 16 and 17 to be actually restored to the constant speed after the start of deceleration (P2).

Returning to FIGS. 2 and 5, after computing the following gap speed limitation and the target speed (step ST7100), the target speed is compared with the following gap speed limitation. That is to say, it is determined by the control device 10 whether the target speed is lower than or equal to the following gap speed limitation (step ST7110), or whether the target speed is higher than the following gap speed limitation (step ST7120).

If the target speed is lower than or equal to the following gap speed limitation (step ST7110), the control device 10 sets the target speed as the determined speed at which the conveyed item subject to correction is actually conveyed by the speed adjusting unit 12 (hereinafter referred to simply as a determined speed) (step ST7111). On the other hand, if the target speed is higher than the following gap speed limitation (step ST7120), the control device 10 sets the following gap speed limitation as the determined speed (step ST7121).

Subsequently, it is determined by the second position detecting unit 13b provided in the second adjusting unit 17 whether or not it has been detected that the front end position of the conveyed item subject to correction S1 in the conveying direction has reached the rotation center position of the rollers 17a and 17b (step ST7200). If the result of the determination in step ST7200 is "Yes", i.e., the front end position of the conveyed item subject to correction in the conveying direction has reached the rotation center position of the rollers 17a and 17b, the acceleration of the conveyed item subject to correction using the first adjusting unit 16 is started (step ST7300). Simultaneously, the acceleration of the conveyed item subject to correction using the second adjusting unit 17 is started (step ST7400).

Then, the first adjusting unit 16 is accelerated to the determined speed (step ST7310), and the second adjusting unit 17 is accelerated to the determined speed (step ST7410). Subsequently, the control device 10 determines whether the acceleration time of the first adjusting unit 16 (see FIG. 3) has elapsed (step ST7320), or whether or not the first position detecting unit 13a provided in the first adjusting unit 16 has detected that the rear end position of the conveyed item subject to correction in the conveying direction has reached the rotation center position of the rollers 16a and 16b (step ST7330). It should be noted that the acceleration time is set to be fixed.

If either the result of the determination in step ST7320 is "Yes", i.e., the acceleration time of the first adjusting unit 16 has elapsed, or the result of the determination in step ST7330 is "Yes", i.e., the rear end position of the conveyed item subject to correction in the conveying direction has reached the rotation center position of the rollers 16a and 16b, then the acceleration at the first adjusting unit 16 is stopped. In other words, the deceleration at the first adjusting unit 16 is started (see P2 in FIG. 3), and the speed of the first adjusting unit 16 is restored to the constant speed (step ST7340).

The control device 10 also determines whether the acceleration time of the second adjusting unit 17 (see FIG. 3) has elapsed (step ST7420), or whether or not the second position detecting unit 13b provided in the second adjusting unit 17 has detected that the rear end position of the conveyed item subject to correction in the conveying direction has reached the rotation center position of the rollers 17a and 17b (step ST7430). It should be noted that the acceleration time is set to be fixed (constant), just like the first adjusting unit 16 (the same applies to the case of the following decelerating operation).

If either the result of the determination in step ST7420 is "Yes", i.e., the acceleration time of the second adjusting unit 17 has elapsed, or the result of the determination in step ST7430 is "Yes", i.e., the rear end position of the conveyed item subject to correction in the conveying direction has reached the rotation center position of the rollers 17a and 17b, then the acceleration at the second adjusting unit 17 is stopped. In other words, the deceleration at the second adjusting unit 17 is started (see P2 in FIG. 3), and the speed of the second adjusting unit 17 is restored to the constant speed (step ST7440).

Figure 6:
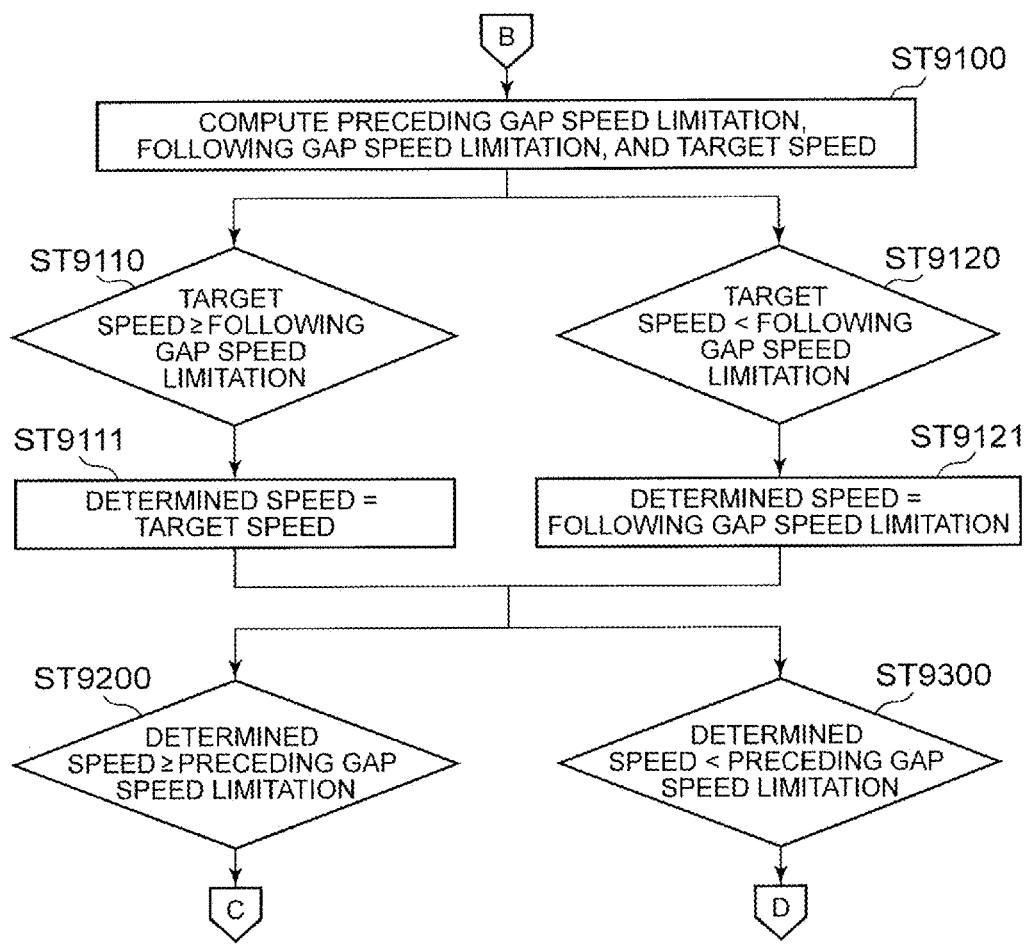
FIG. 6 is a flowchart illustrating the operation of the gap correction unit according to the first embodiment.

On the other hand, as shown in FIGS. 4 and 6, if the value of the preceding gap is smaller than the value of the following gap (step ST9000), the conveyed item subject to correction needs to be decelerated at the speed adjusting unit 12 to reduce the difference between the value of the preceding gap and the value of the following gap.

When performing this decelerating operation, the control device 10 initially computes a following gap speed limitation (conveying speed lower limit value), a preceding gap speed limitation (deceleration start threshold value), and a target conveying speed (target speed) (step ST9100). The target conveying speed mentioned here refers to a calculated speed after deceleration that is necessary for converging the value of the preceding gap and the value of the following gap within a predetermined value range.

Here, referring to FIGS. 10A to 10D, a detailed description will be given of the following gap speed limitation and the preceding gap speed limitation in the case of decelerating the conveyed item subject to correction. FIGS. 10A to 10D are illustrative diagrams showing the case of decelerating the conveyed item subject to correction S1 at the speed adjusting unit 12 according to the first embodiment, and show the behavior of the speed adjusting unit 12, the conveyed item subject to correction S1, and the following conveyed item S2 at respective timings.

Figure 10A:
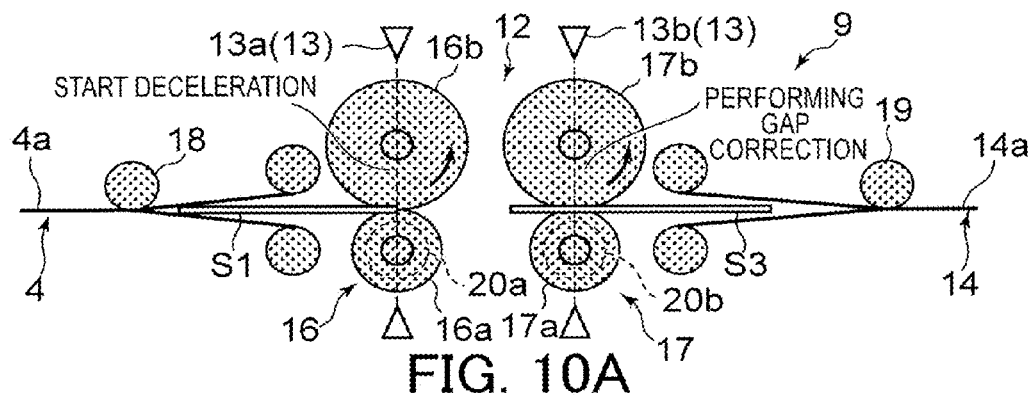
FIGS. 10A to 10D are illustrative diagrams showing a case of decelerating the conveyed item according to the first embodiment.
Figure 10B:
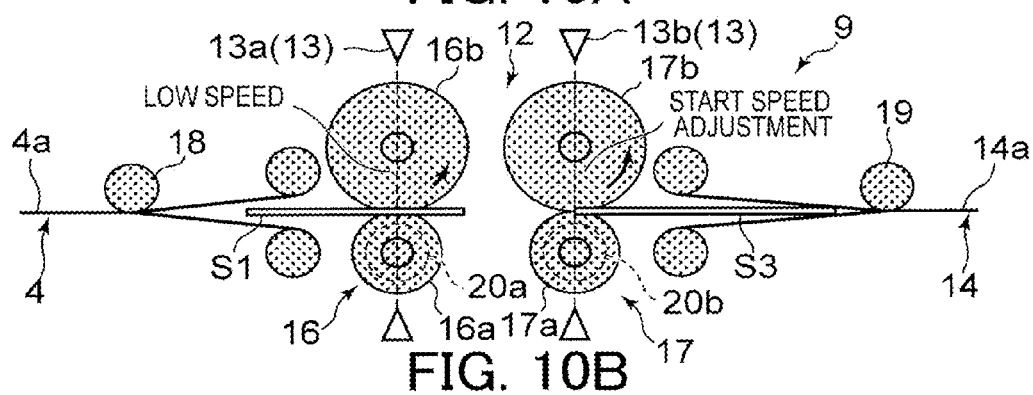
Figure 10C:
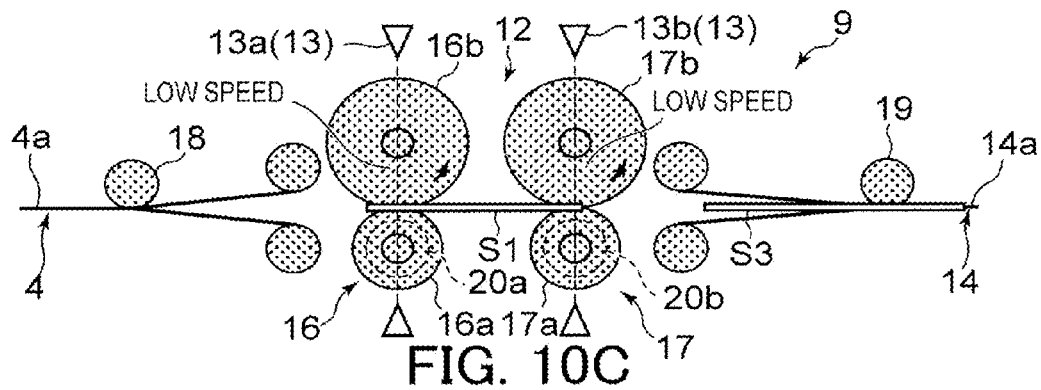
Figure 10D:
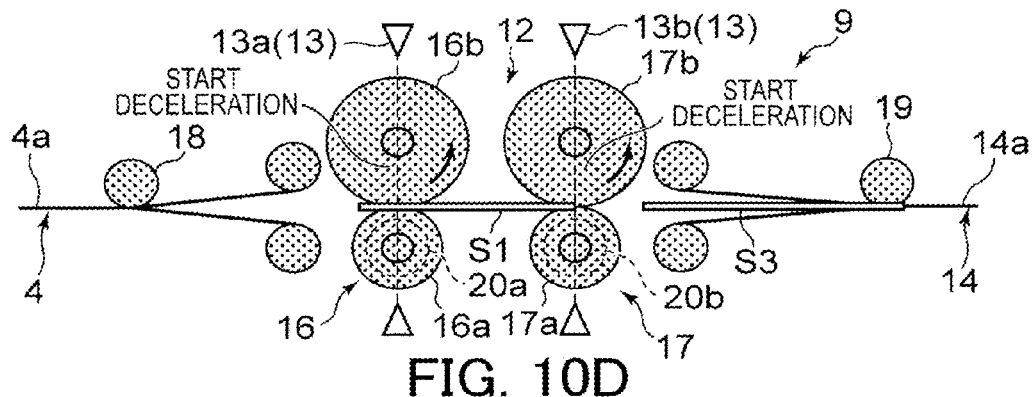

Here, in the case of decelerating the conveyed item subject to correction S1, there are roughly speaking two cases, namely the case where the timing of starting deceleration at the first adjusting unit 16 is earlier than the timing of starting deceleration at the second adjusting unit 17 as shown in FIG. 10A, and the case where the timing of starting deceleration at the first adjusting unit 16 is simultaneous with the timing of starting deceleration at the second adjusting unit 17 as shown in FIG. 10D. This point is different from the above-described case of accelerating the conveyed item subject to correction. For this reason, two speed limitations, namely the following gap speed limitation and the preceding gap speed limitation are necessary.

Regarding the following gap speed limitation, the same idea as the idea of the above-described following gap speed limitation in the case of accelerating the conveyed item subject to correction S1 applies (see FIG. 3). However, the following gap speed limitation in the case of decelerating the conveyed item subject to correction S1 is the conveying speed lower limit value. That is to say, the deceleration is started by the adjusting units 16 and 17, the acceleration is started after the predetermined deceleration time elapses, and the speed of the adjusting units 16 and 17 is ultimately restored to the constant speed. Here, the restoration to the constant speed after the start of acceleration takes time (restoration time). If the following conveyed item (not shown in FIGS. 10A to 10D) reaches the first adjusting unit 16 in the period of this restoration time, it is difficult to appropriately perform gap correction for the following conveyed item. For this reason, it is necessary to impose a limitation on the decelerated speed in accordance with the length of the following gap. This speed limitation is the following gap speed limitation in the case of decelerating the conveyed item subject to correction S1.

Next, the preceding gap speed limitation will be described. As shown in FIG. 10A, in the case where the timing of starting deceleration at the first adjusting unit 16 is earlier than the timing of starting deceleration at the second adjusting unit 17, there are cases where a preceding conveyed item S3 is undergoing gap correction using the second adjusting unit 17 at the time point when the deceleration of the conveyed item subject to correction S1 is started by the first adjusting unit 16.

In this case, the second adjusting unit 17 needs to be synchronous with the speed of the first adjusting unit 16 at the time point when the conveyed item subject to correction S1 reaches the second adjusting unit 17. That is to say, as shown in FIG. 10B, the speed adjustment of the second adjusting unit 17 is started when the second position detecting unit 13b provided in the second adjusting unit 17 detects that the rear end position of the preceding conveyed item S3 in the conveying direction has reached the rotation center position of the rollers 17a and 17b.

Then, as shown in FIG. 10C, the speed of the first adjusting unit 16 needs to be the same as the speed of the second adjusting unit 17 when the second position detecting unit 13b detects that the front end position of the conveyed item subject to correction S1 in the conveying direction has reached the rotation center position of the rollers 17a and 17b. This is because, if the speed of the first adjusting unit 16 and the speed of the second adjusting unit 17 are different, there is the possibility that an excessive stress is exerted on the conveyed item subject to correction S1 and the quality of this conveyed item subject to correction S1 is decreased.

This situation is more likely to occur as the interval between the conveyed item subject to correction S1 and the preceding conveyed item S3 (preceding gap) is shorter. For this reason, it is necessary to impose a limitation on the timing of starting deceleration of the conveyed item subject to correction S1 in accordance with the length of the preceding gap and the conveying speed of the preceding conveyed item S3 at the second adjusting unit 17. That is to say, as shown in FIG. 10D, the deceleration needs to be started when the second position detecting unit 13b detects that the front end position of the conveyed item subject to correction S1 in the conveying direction has reached the rotation center position of the rollers 17a and 17b. This limitation is the preceding gap speed limitation.

Returning to FIGS. 2 and 6, after computing the following gap speed limitation, the preceding gap speed limitation, and the target conveying speed (step ST9100), the target speed is compared with the following gap speed limitation. That is to say, it is determined by the control device 10 whether the target speed is higher than or equal to the following gap speed limitation (step ST9110), or the target speed is lower than the following gap speed limitation (step ST9120).

If the target speed is higher than or equal to the following gap speed limitation (step ST9110), the control device 10 sets the target speed to the determined speed (step ST9111). On the other hand, if the target speed is lower than the following gap speed limitation (step ST9120), the control device 10 sets the following gap speed limitation as the determined speed (step ST9121).

Subsequently, the determined speed is compared with the preceding gap speed limitation. That is to say, it is determined by the control device 10 whether the determined speed is higher than or equal to the preceding gap speed limitation (step ST9200), or the determined speed is lower than the preceding gap speed limitation (step ST9300).

Figure 7:
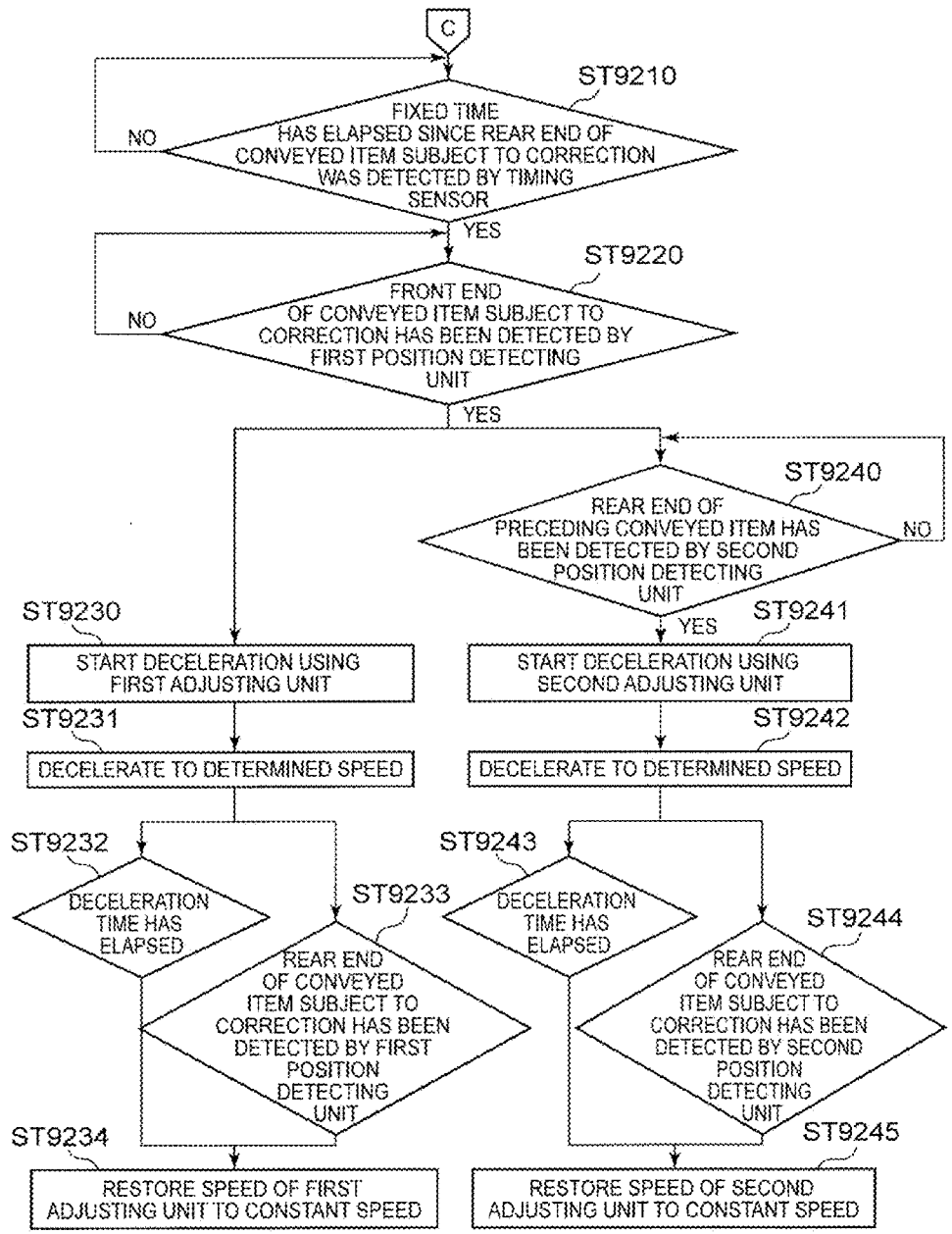
FIG. 7 is a flowchart illustrating the operation of the gap correction unit according to the first embodiment.

If the determined speed is higher than or equal to the preceding gap speed limitation (step ST9200), the control device 10 determines whether or not a fixed time has elapsed since the rear end of the conveyed item subject to correction in the conveying direction was detected by the timing sensor 15 (step ST9210, see FIG. 7). On the other hand, if the determined speed is lower than the preceding gap speed limitation (step ST9300), the control device 10 determines whether or not the second position detecting unit 13b provided in the second adjusting unit 17 has detected that the front end position of the conveyed item subject to correction in the conveying direction has reached the rotation center position of the rollers 17a and 17b (step ST9310, see FIG. 8).

As shown in FIGS. 2 and 7, if the result of the determination in step ST9210 is "Yes", i.e., the fixed time has elapsed since the time point when the trailing end of the conveyed item subject to correction in the conveying direction was detected by the timing sensor 15, it is determined whether or not the first position detecting unit 13a provided in the first adjusting unit 16 has detected that the front end position of the conveyed item subject to correction in the conveying direction has reached the rotation center position of the rollers 16a and 16b (step ST9220).

If the result of the determination in step ST9220 is "Yes", i.e., the front end position of the conveyed item subject to correction in the conveying direction has reached the rotation center position of the rollers 16a and 16b, deceleration of the conveyed item subject to correction using the first adjusting unit 16 is started (step ST9230). Then, the first adjusting unit 16 is decelerated to the determined speed (step ST9231).

Subsequently, the control device 10 determines whether the deceleration time of the first adjusting unit 16 has elapsed (step ST9232), or whether or not the first position detecting unit 13a provided in the first adjusting unit 16 has detected that the rear end position of the conveyed item subject to correction in the conveying direction has reached the rotation center position of the rollers 16a and 16b (step ST9233). It should be noted that the deceleration time is set to be fixed (constant), just like the acceleration time.

If either the result of the determination in step ST9232 is "Yes", i.e., the deceleration time of the first adjusting unit 16 has elapsed, or the result of the determination in step ST9233 is "Yes", i.e., the rear end position of the conveyed item subject to correction in the conveying direction has reached the rotation center position of the rollers 16a and 16b, then the deceleration at the first adjusting unit 16 is stopped. In other words, the acceleration at the first adjusting unit 16 is started, and the speed of the first adjusting unit 16 is restored to the constant speed (step ST9234).

If the result of the determination in step ST9220 is "Yes", i.e., the front end position of the conveyed item subject to correction in the conveying direction has reached the rotation center position of the rollers 16a and 16b, the control device 10 determines whether or not the second position detecting unit 13b provided in the second adjusting unit 17 has detected that the rear end position of the preceding conveyed item in the conveying direction has reached the rotation center position of the rollers 17a and 17b (step ST9240). If the result of the determination in step ST9240 is "Yes", i.e., the rear end position of the conveyed item subject to correction in the conveying direction has reached the rotation center position of the rollers 17a and 17b, the deceleration at the second adjusting unit 17 is started immediately thereafter (step ST9241). At this time, the deceleration is started regardless of whether or not the conveyed item subject to correction has reached the second adjusting unit 17. Then, the second adjusting unit 17 is decelerated to the determined speed (step ST9242).

Subsequently, the control device 10 determines whether the deceleration time of the second adjusting unit 17 has elapsed (step ST9243), or whether or not the second position detecting unit 13b provided in the second adjusting unit 17 has detected that the rear end position of the conveyed item subject to correction in the conveying direction has reached the rotation center position of the rollers 17a and 17b (step ST9244).

It should be noted that the deceleration time here is also fixed (constant), and is set to be the same as the deceleration time in step ST9232. Here, the timing of starting to count the deceleration time is the time point when the deceleration at the second adjusting unit 17 in step ST9241 is started. However, the configuration is not limited thereto. It is also possible to set the time when the second position detecting unit 13b detects that the front end position of the conveyed item subject to correction in the conveying direction has reached the rotation center position of the rollers 17a and 17b of the second adjusting unit 17 as the timing of starting to count the deceleration time.

Subsequently, if either the result of the determination in step ST9243 is "Yes", i.e., the deceleration time of the second adjusting unit 17 has elapsed, or the result of the determination in step ST9244 is "Yes", i.e., the rear end position of the conveyed item subject to correction in the conveying direction has reached the rotation center position of the rollers 17a and 17b, then the deceleration at the second adjusting unit 17 is stopped. In other words, the acceleration at the second adjusting unit 17 is started, and the speed of the second adjusting unit 17 is restored to the constant speed (step ST9245).

Figure 8:
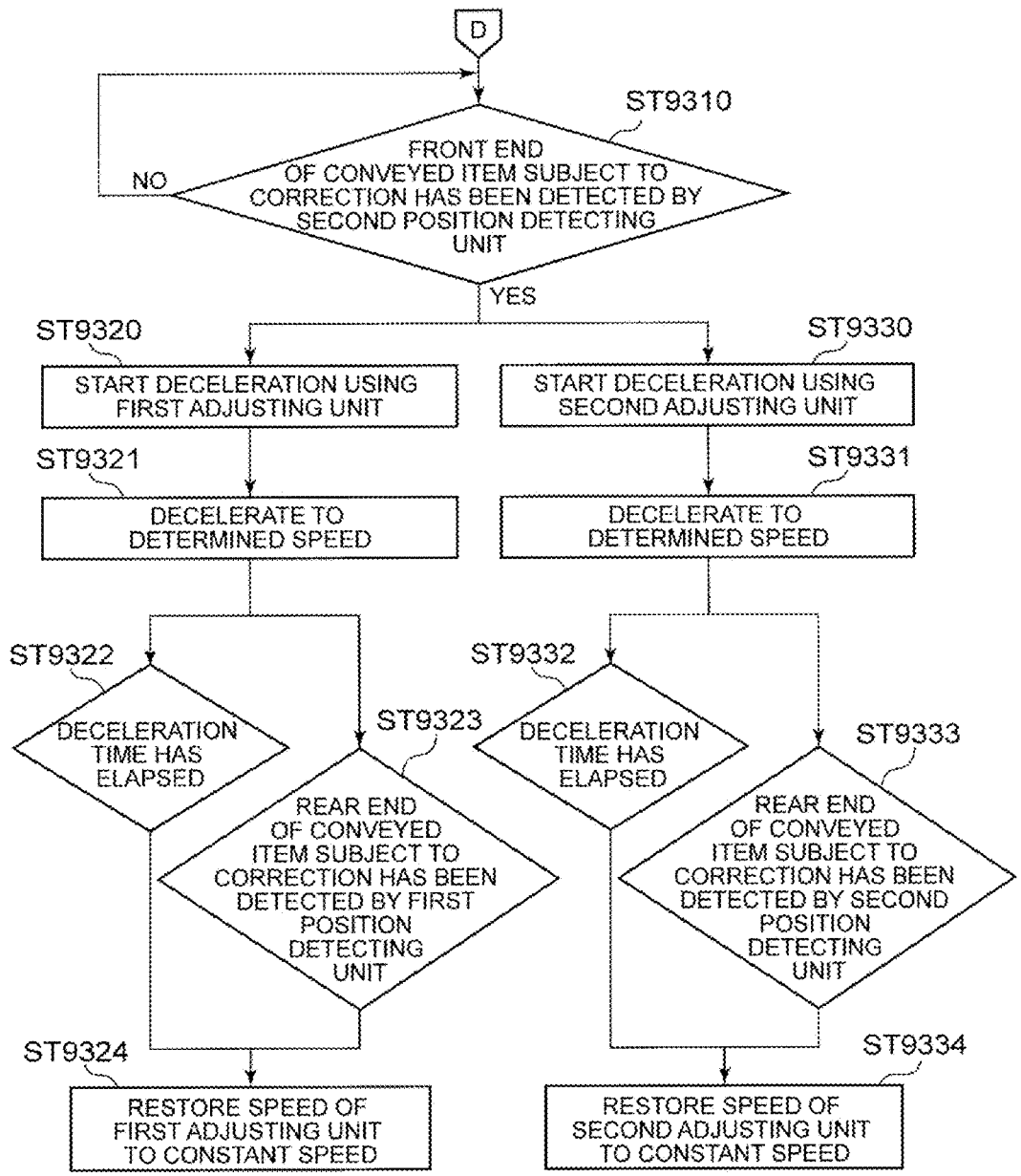
FIG. 8 is a flowchart illustrating the operation of the gap correction unit according to the first embodiment.

On the other hand, as shown in FIGS. 2 and 8, if the result of the determination in step ST9310 is "Yes", i.e., the second position detecting unit 13b has detected that the front end position of the conveyed item subject to correction in the conveying direction has reached the rotation center position of the rollers 17a and 17b, the deceleration of the conveyed item subject to correction using the first adjusting unit 16 is started (step ST9320), and simultaneously, the deceleration of the conveyed item subject to correction using the second adjusting unit 17 is started (step ST9330).

Then, the first adjusting unit 16 is decelerated to the determined speed (step ST9321), and the second adjusting unit 17 is decelerated to the determined speed (step ST9331). Subsequently, the control device 10 determines whether the deceleration time of the first adjusting unit 16 has elapsed (step ST9322), or whether or not the first position detecting unit 13a provided in the first adjusting unit 16 has detected that the rear end position of the conveyed item subject to correction in the conveying direction has reached the rotation center position of the rollers 16a and 16b (step ST9323). It should be noted that the deceleration time is set to be fixed.

If either the result of the determination in step ST9322 is "Yes", i.e., the deceleration time of the first adjusting unit 16 has elapsed, or the result of the determination in step ST9323 is "Yes", i.e., the rear end position of the conveyed item subject to correction in the conveying direction has reached the rotation center position of the rollers 16a and 16b, then the deceleration at the first adjusting unit 16 is stopped. In other words, the acceleration at the first adjusting unit 16 is started, and the speed of the first adjusting unit 16 is restored to the constant speed (step ST9324).

Subsequently, the control device 10 determines whether the deceleration time of the second adjusting unit 17 has elapsed (step ST9332), or whether or not the second position detecting unit 13b provided in the second adjusting unit 17 has detected that the rear end position of the conveyed item subject to correction in the conveying direction has reached the rotation center position of the rollers 17a and 17b (step ST9333). It should be noted that the deceleration time is set to be fixed (constant), just like the first adjusting unit 16.

If either the result of the determination in step ST9332 is "Yes", i.e., the deceleration time of the second adjusting unit 17 has elapsed, or the result of the determination in step ST9333 is "Yes", i.e., the rear end position of the conveyed item subject to correction in the conveying direction has reached the rotation center position of the rollers 17a and 17b, then the deceleration at the second adjusting unit 17 is stopped. In other words, the acceleration at the second adjusting unit 17 is started, and the speed of the second adjusting unit 17 is restored to the constant speed (step ST9334). The adjustment of the gap preceding and the gap following the conveyed item using the gap correction unit 9 is thereby completed.

Thus, the gap correction unit 9 according to this embodiment includes the two adjusting units 16 and 17 as the speed adjusting unit 12. Moreover, the adjusting units 16 and 17 are provided with the position detecting units 13a and 13b, respectively. The acceleration/deceleration speeds at the two adjusting units 16 and 17 are individually controlled based on the result of the detection of the gap detecting unit 11 and the result of the detection of the position detecting units 13a and 13b. Therefore, the gap preceding and the gap following the conveyed item can be corrected, and the quality of the conveyed item can be appropriately maintained without exerting an excessive stress on the conveyed item, regardless of the length of the conveyed item.

Assuming that L1 is the distance between the rotation center position of the rollers 16a and 16b of the first adjusting unit 16 and the rotation center position of the conveying roller 18 arranged immediately upstream from the first adjusting unit 16, L2 is the distance between the rotation center position of the rollers 16a and 16b of the first adjusting unit 16 and the rotation center position of the rollers 17a and 17b of the second adjusting unit 17, the length of the shortest conveyed item, which is a conveyed item having a shortest length, is Lmin, Lmax is the length of the longest conveyed item, which is a conveyed item having a longest length, and a1 is the distance with which the shortest conveyed item that has been carried past the conveying roller 18 arranged immediately upstream from the first adjusting unit 16 can be delivered to the first adjusting unit 16, then the distances L1 and L2 are set so as to satisfy Expressions (1) to (3). It is therefore possible to reliably deliver the conveyed items from the conveying unit 4 to the first adjusting unit 16, and reliably deliver the conveyed items from the first adjusting unit 16 to the second adjusting unit 17, regardless of the length of the conveyed items. Additionally, the gap preceding and the gap following each conveyed item can be reliably corrected using the two adjusting units 16 and 17 by appropriately maintaining the distance between the conveying roller 18 and the first adjusting unit 16 and the distance between the first adjusting unit 16 and the second adjusting unit 17.

Furthermore, assuming that L3 is the distance between the rotation center position of the rollers 17a and 17b of the second adjusting unit 17 and the rotation center position of the conveying roller 19 arranged immediately downstream from the second adjusting unit 17, a2 is the distance with which the shortest conveyed item that has been carried past the second adjusting unit 17 can be delivered to the conveying roller 19 arranged immediately downstream from this second adjusting unit 17, and Dmax is the conveyed item maximum moving distance by which a conveyed item moves when this conveyed item is maximally accelerated at the second adjusting unit 17, then the distance L3 is set so as to satisfy Expression (4). It is therefore possible to reliably deliver the conveyed items from the second adjusting unit 17 to the downstream conveying unit 14. Furthermore, while delivering each conveyed item from the second adjusting unit 17 to the downstream conveying unit 14, it is possible to reliably correct the gap preceding and the gap following the conveyed item while preventing an excessive stress from being exerted on this conveyed item.

The first position detecting unit 13a is provided so as to correspond to the rotation center position of the rollers 16a and 16b of the first adjusting unit 16. Furthermore, the rotation center position of the rollers 17a and 17b of the second adjusting unit 17 is provided so as to correspond to the second position detecting unit 13b. Therefore, it is possible to accurately detect the time when the front end position and the rear end position of each conveyed item in the conveying direction have reached the rotation center positions of the rollers 16a and 16b and the rollers 17a, and 17b, using the position detecting units 13a and 13b, respectively. As a result, drive control for the adjusting units 16 and 17 can be accurately performed.

Furthermore, of the drive rollers 16a and 17a and the driven rollers 16b and 17b that constitute the adjusting units 16 and 17, the driven rollers 16b and 17b are made of an elastically deformable material. Therefore, even if conveyed items having different thicknesses pass through between the drive rollers 16a and 17a and the driven rollers 16b and 17b, an excessive stress can be prevented from being exerted on the conveyed items as a result of the driven rollers 16b and 17b undergoing elastic deformation. Furthermore, the outer diameter of the driven rollers 16b and 17b is set larger than the outer diameter of the drive rollers 16a and 17a. Therefore, the difference in the thickness of the conveyed items can be sufficiently absorbed by the driven rollers 16b and 17b.

Furthermore, in the case of accelerating the conveyed item using the speed adjusting unit 12, the control device 10 computes the following gap speed limitation (conveying speed upper limit value) and the calculated target conveying speed (target speed) after acceleration that is necessary for converging the value of the preceding gap and the value of the following gap within the predetermined value range (ST7100). Then, the following gap speed limitation is compared with the target speed, and the actual speed (determined speed) of the conveyed item after acceleration is determined based on this comparison result (steps ST7110 to ST7121). Therefore, it is possible to correctly perform gap correction for the conveyed item using the gap correction unit 9 without making the correction for the conveyed item following the conveyed item subject to correction unstable.

In the case of accelerating the conveyed item using the speed adjusting unit 12, the control device 10 performs control so as to simultaneously accelerate the two adjusting units 16 and 17 at the time point when the conveyed item reaches the second adjusting unit 17 of the two adjusting units 16 and 17 (steps ST7200 to ST7400). Therefore, gap correction for the conveyed item subject to correction can be performed without considering the gap preceding the conveyed item subject to correction. Accordingly, the control program can be simplified.

Furthermore, in the case of decelerating the conveyed item using the speed adjusting unit 12, the control device 10 computes the following gap speed limitation (conveying speed lower limit value) and the calculated target conveying speed (target speed) after deceleration necessary for converging the value of the preceding gap and the value of the following gap within the predetermined value range (step ST9100). Then, the following gap speed limitation is compared with the target speed, and the actual speed (determined speed) of the conveyed item after deceleration is determined based on this comparison result (steps ST9110 to ST9121). Therefore, it is possible to correctly perform gap correction for the conveyed item using the gap correction unit 9 without making the correction for the conveyed item following the conveyed item subject to correction unstable.

In the case of decelerating the conveyed item using the speed adjusting unit 12, the control device 10 computes the preceding gap speed limitation (deceleration start threshold value), and compares this preceding gap speed limitation with the determined speed (steps ST9100, ST9200, and ST9300). Based on this comparison result, the control device 10 chooses one of the two adjusting units 16 and 17 and determines to start deceleration of the conveyed item at the time point when the conveyed item reaches the chosen one of the adjusting units 16 and 17 (steps ST9210, ST9220, and ST9310). It is therefore possible to prevent the speeds of the two adjusting units 16 and 17 from being different in a state where the conveyed item is located across the two adjusting units 16 and 17. Accordingly, it is possible to appropriately maintain the quality of the conveyed item at the speed adjusting unit 12 without exerting an excessive stress on the conveyed item.

The above embodiment has described the case of providing the gap correction unit 9 in the conveying apparatus 1 for conveying postal items which can be sheet-shaped. However, the configuration is not limited thereto, and the configuration of the gap correction unit 9 is applicable to conveying apparatuses for conveying various conveyed items.

In the above embodiment, the gap detecting unit 11 detects the length, thickness, and weight of each conveyed item as well as the gap preceding and the gap following the conveyed item. However, if the gap correction unit 9 is operating appropriately, the length, thickness, and weight of the conveyed item do not necessarily have to be detected. Therefore, if the weight of the conveyed item is not detected, a configuration necessary for detecting the weight, such as a strain gage, is not necessary either.

Furthermore, the above embodiment has described the case where, if the conveyed item is accelerated at the gap correction unit 9, the acceleration of the conveyed item is started at the time point when the conveyed item reaches the second adjusting unit 17, without computing the preceding gap speed limitation. However, the configuration is not limited thereto, and a configuration may also be employed in which the preceding gap speed limitation is also computed in the case of accelerating the conveyed item, and drive control for the adjusting units 16 and 17 is performed as in the case of decelerating the conveyed item. That is to say, a configuration is possible in which, if the conveyed item is accelerated, the preceding gap speed limitation is compared with the determined speed, and one of the two adjusting units 16 and 17 is chosen based on the comparison result such that the acceleration of the conveyed item is started at the time point when the conveyed item reaches the chosen one of the adjusting units 16 and 17.

The above embodiment has described the case where, in the case of decelerating the conveyed item at the speed adjusting unit 12, a process of starting deceleration of the conveyed item subject to correction using the first adjusting unit 16 (step ST9230) and a process of determining whether or not the second position detecting unit 13*b* provided in the second adjusting unit 17 has detected that the rear end position of the preceding conveyed item in the conveying direction has reached the rotation center position of the rollers 17*a* and 17*b* (step ST9240) are simultaneously performed, and the deceleration at the second adjusting unit 17 is started after this step ST9240. However, the configuration is not limited thereto, and the deceleration may also be performed in advance at the second adjusting unit 17 at the time point when the rear end position of the preceding conveyed item in the conveying direction has passed through it. In this case, the deceleration at the second adjusting unit 17 may be started prior to the first adjusting unit 16.

Furthermore, the above embodiment has described the case where the speed adjusting unit 12 includes the two adjusting units 16 and 17. However, the configuration is not limited thereto, and three or more adjusting units may be provided.

The above embodiment has described the case where the position detecting units 13*a* and 13*b* are provided so as to correspond to the rotation center positions of the rollers 16*a* and 17*a* and the rollers 16*b* and 17*b*, respectively. However, the configuration is not limited thereto, and the position detecting units 13*a* and 13*b* need only be provided so as to correspond to the adjusting units 16 and 17, respectively. Then, a configuration need only be provided in which it can be detected using the position detecting units 13*a* and 13*b* whether or not the front and rear end positions of the conveyed item in the conveying direction have reached the rotation center position of the rollers 16*a* and 16*b*. For example, a configuration may be employed in which the position detecting units 13*a* and 13*b* are arranged on the upstream side in the conveying direction relative to the rotation center position of the rollers 16*a* and 16*b*, and it is deemed that the front and rear end positions of the conveyed item in the conveying direction have reached the rotation center position of the rollers 16*a* and 16*b* after a lapse of a predetermined time from the time point when the front and rear end positions are detected by these position detecting units 13*a* and 13*b*. Furthermore, a configuration may also be employed in which it is detected by the position detecting units 13*a* and 13*b* that the front and rear end positions of the conveyed item in the conveying direction have reached any position in the adjusting units 16 and 17 rather than the rotation center position of the rollers 16*a* and 16*b*.

The above embodiment has described the case where the control device 10 is configured to retrieve the information detected by the gap detecting unit 11 (length, thickness, and weight of the conveyed item) at the time point when the conveyed item reaches the timing sensor 15. However, the configuration is not limited thereto, and a configuration may also be employed in which the gap detecting unit 11 is provided at a location where the timing sensor 15 is to be arranged, and the timing sensor 15 is eliminated.

Second Embodiment

Hereinafter, a conveying apparatus 1 according to a second embodiment will be described. It should be noted that the same portions as those in the first embodiment will be assigned the same signs to omit detailed descriptions thereof.

Figure 11:
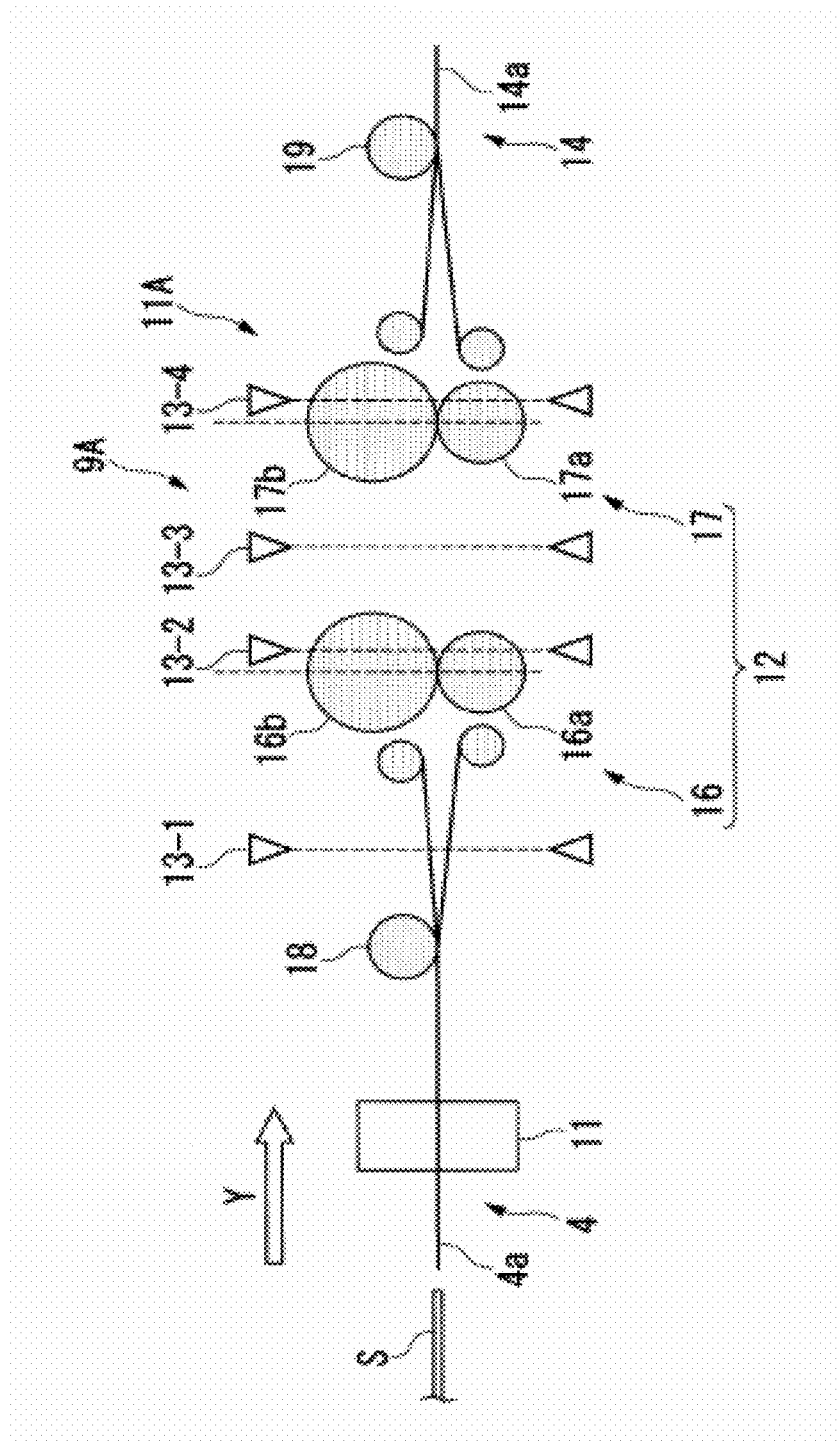
FIG. 11 is a configuration diagram of a gap correction unit 9A according to a second embodiment.

FIG. 11 is a configuration diagram of a gap correction unit 9A according to a second embodiment. The gap correction unit 9A in the conveying apparatus 1 according to the second embodiment is different from the gap correction unit 9 in the conveying apparatus 1 according to the first embodiment in that the gap correction unit 9A includes a second gap detecting unit 11A (second gap detecting unit) that is provided in a speed adjusting unit (second adjusting unit 17) downstream from two speed adjusting units (16 and 17) arranged next to each other in the conveying direction, and detects a second preceding gap between a conveyed item S and a preceding conveyed item that is conveyed immediately before the conveyed item S. This difference will be mainly described below.

The second gap detecting unit 11A is constituted by a photoelectric sensor or the like, for example. The second gap detecting unit 11A is provided in a speed adjusting unit (second adjusting unit 17) downstream from the two speed adjusting units (16 and 17) that are arranged next to each other in the conveying direction Y. In the second embodiment, the second gap detecting unit 11A detects a second preceding gap of a conveyed item S which has reached a position that is shifted by a predetermined distance from the rotation center position of a drive roller 17a and a driven roller 17b to the downstream side in the conveying direction Y. The second gap detecting unit 11A detects the second preceding gap between the conveyed item S and the preceding conveyed item that is conveyed immediately before the conveyed item S. The second gap detecting unit 11A outputs the result of the detection of the second preceding gap as a sensor signal to the control device 10. It should be noted that the amount of the shift of the second gap detecting unit 11A from the rotation center position of the drive roller 17a and the driven roller 17b need only be a distance that is small to the extent that the front end position or the rear end position of the conveyed item S in the conveying direction can be deemed to have passed through the second adjusting unit 17 based on the position at which the conveyed item S is held by the drive roller 17a and the driven roller 17b.

The conveyed item position detecting unit 13 may include a position detecting unit 13-1, a position detecting unit 13-2, a position detecting unit 13-3, and a position detecting unit 13-4, but the configuration is not limited thereto. The position detecting unit 13-1, the position detecting unit 13-2, the position detecting unit 13-3, and the position detecting unit 13-4 are each constituted by a transmission photoelectric sensor, for example.

The position detecting unit 13-1 is provided downstream from the conveying roller 18 and upstream from the first adjusting unit 16. The position detecting unit 13-1 detects that the front end position and the rear end position of the conveyed item S in the conveying direction have respectively reached the upstream side of the first adjusting unit 16. The position detecting unit 13-2 is provided at a position that is shifted by a predetermined distance from the rotation center position of a drive roller 16a and a driven roller 16b to the downstream side in the conveying direction Y. The position detecting unit 13-2 detects that the front end position and the rear end position of the conveyed item S in the conveying direction have respectively reached the downstream side of the first adjusting unit 16. The position detecting unit 13-3 is provided at any position between the first adjusting unit 16 and the second adjusting unit 17 in the conveying direction Y. The position detecting unit 13-3 detects that the front end position and the rear end position of the conveyed item S in the conveying direction respectively have reached the space between the first adjusting unit 16 and the second adjusting unit 17. It should be noted that in FIG. 11, the position detecting unit 13-3 detects that the front end position and the rear end position of the conveyed item S in the conveying direction each have reached a substantial center position between the first adjusting unit 16 and the second adjusting unit 17. The position detecting unit 13-4 is provided at a position that is shifted by a predetermined distance from the rotation center position of the drive roller 17a and the driven roller 17b to the downstream side in the conveying direction Y. The position detecting unit 13-4 detects that the front end position and the rear end position of the conveyed item S in the conveying direction each have reached the downstream side of the second adjusting unit 17. It should be noted that the amount of the shift of the position detecting unit 13-4 from the rotation center position of the drive roller 16a and the driven roller 16b need only be a distance that is small to the extent that the front end position or the rear end position of the conveyed item S in the conveying direction can be deemed to have passed through the first adjusting unit 16 from an upstream position at which the conveyed item S is held by the drive roller 16a and the driven roller 16b.

Although it is assumed in the description of the second embodiment that the position at which the second preceding gap is detected by the second gap detecting unit 11A is the same as the position at which the front end position and the rear end position of the conveyed item S in the conveying direction are detected by the position detecting unit 13-4, the configuration is not limited thereto. Furthermore, although the position detecting unit 13-3 is provided in the second embodiment, a configuration may be employed in which, instead of providing the position detecting unit 13-3, it is estimated that the front end position and the rear end position of the conveyed item S in the conveying direction each have reached a position between the first adjusting unit 16 and the second adjusting unit 17 based on the time when the front end position and the rear end position of the conveyed item S in the conveying direction each have reached the position detecting unit 13-2, the speed of the conveyed item S, and the like.

Referring to FIGS. 12, 13, 14, and 15, the following is a description of processing for adjusting the gap preceding and the gap following the conveyed item S using the conveying apparatus 1 according to the second embodiment. FIGS. 12, 13, 14, and 15 are flowcharts illustrating the operation of the gap correction unit 9A according to the second embodiment.

The illustration in FIG. 4 in the first embodiment is cited for the basic operation. That is to say, the conveying apparatus 1 according to the second embodiment conveys the conveyed items S one by one using a conveying unit 4 via a supply unit 2 and a take-out unit 3 (step ST1000). When the conveyed items S are conveyed by the conveying unit 4, the gap detecting unit 11 detects the length, thickness, and weight of each conveyed item S (step ST2000), and detects a gap preceding and a gap following each conveyed item S (step ST3000).

Figure 12:
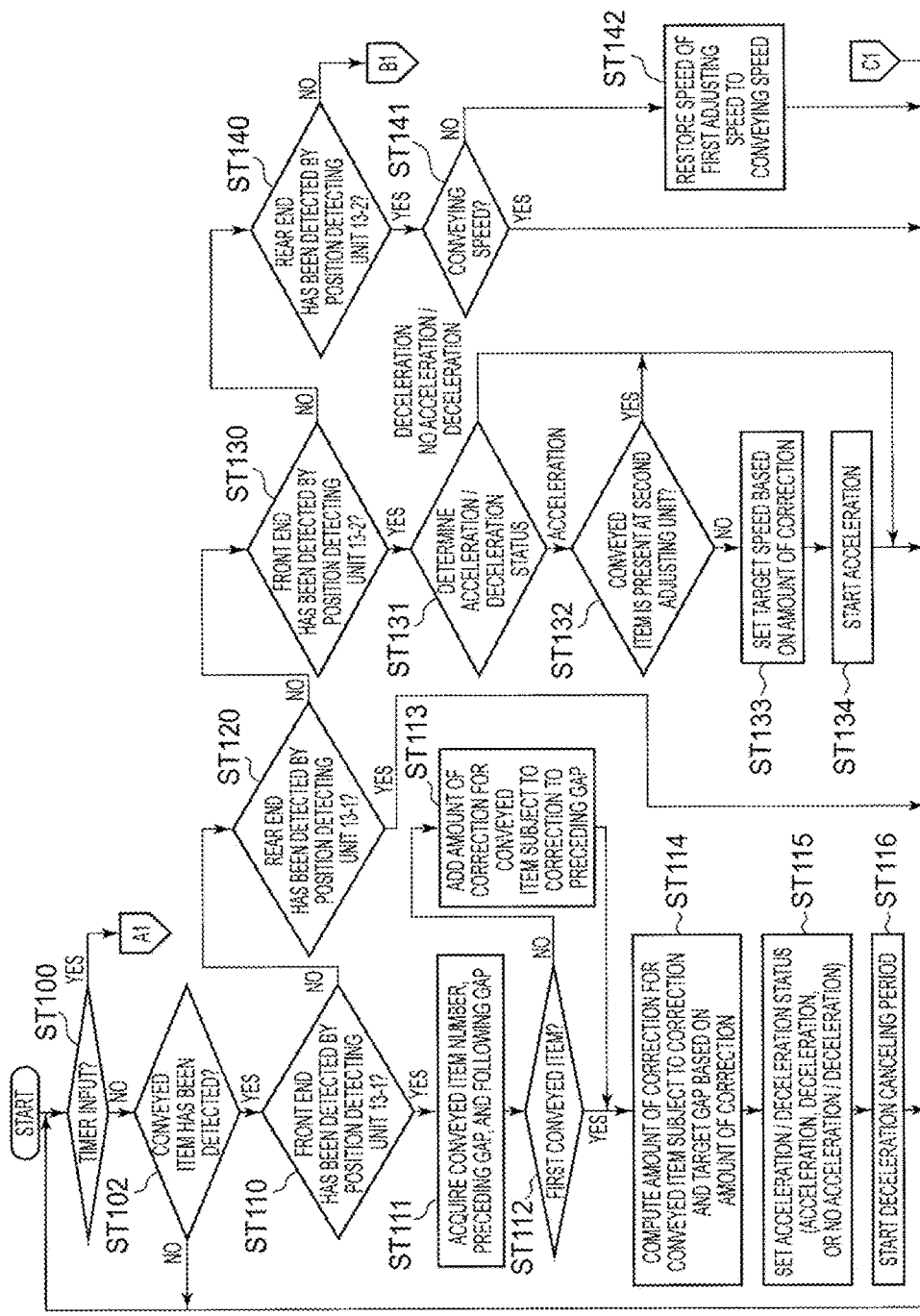
FIG. 12 is a flowchart illustrating the operation of the gap correction unit 9A according to the second embodiment.
Figure 13:
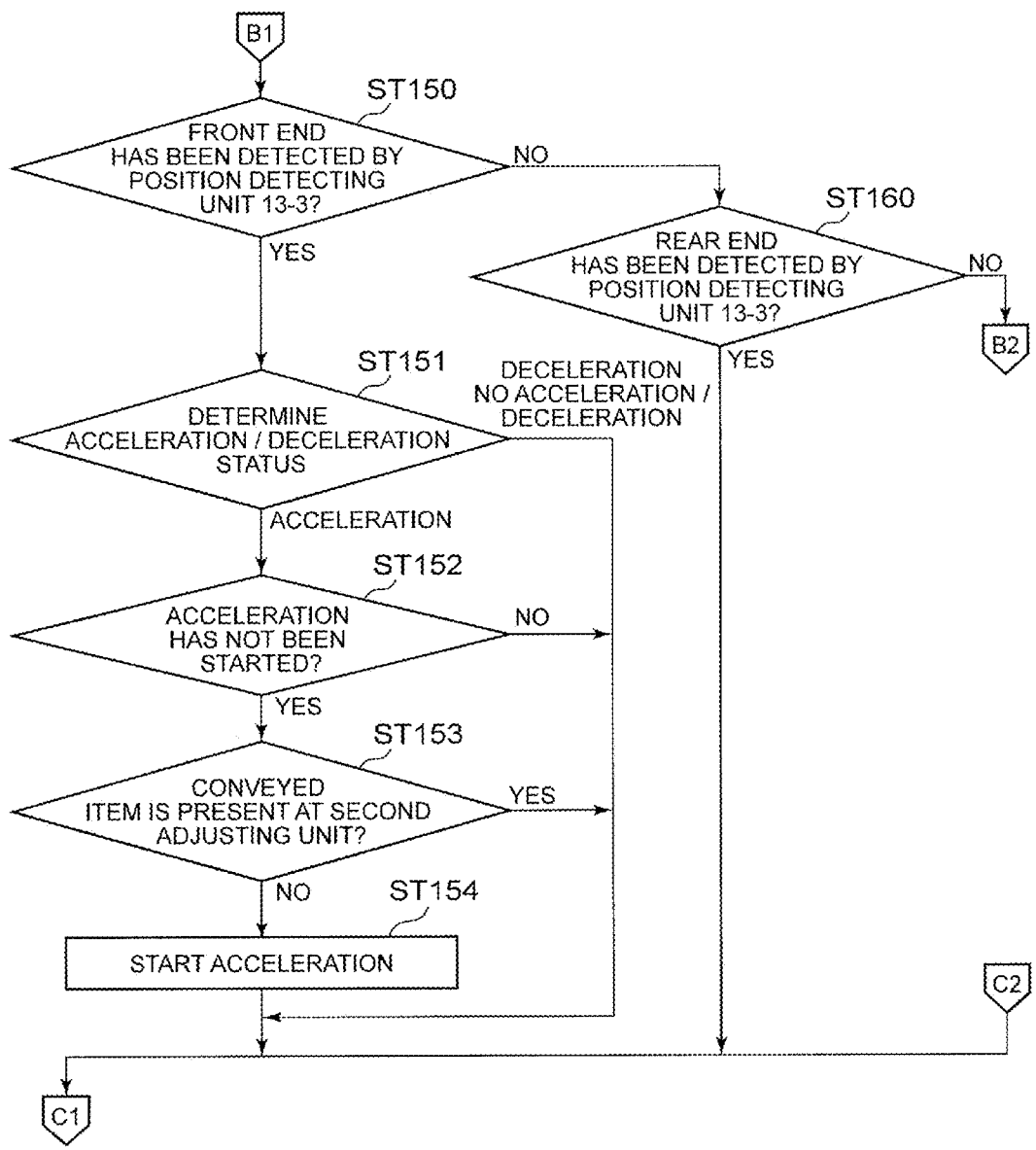
FIG. 13 is a flowchart illustrating the operation of the gap correction unit 9A according to the second embodiment.
Figure 14:
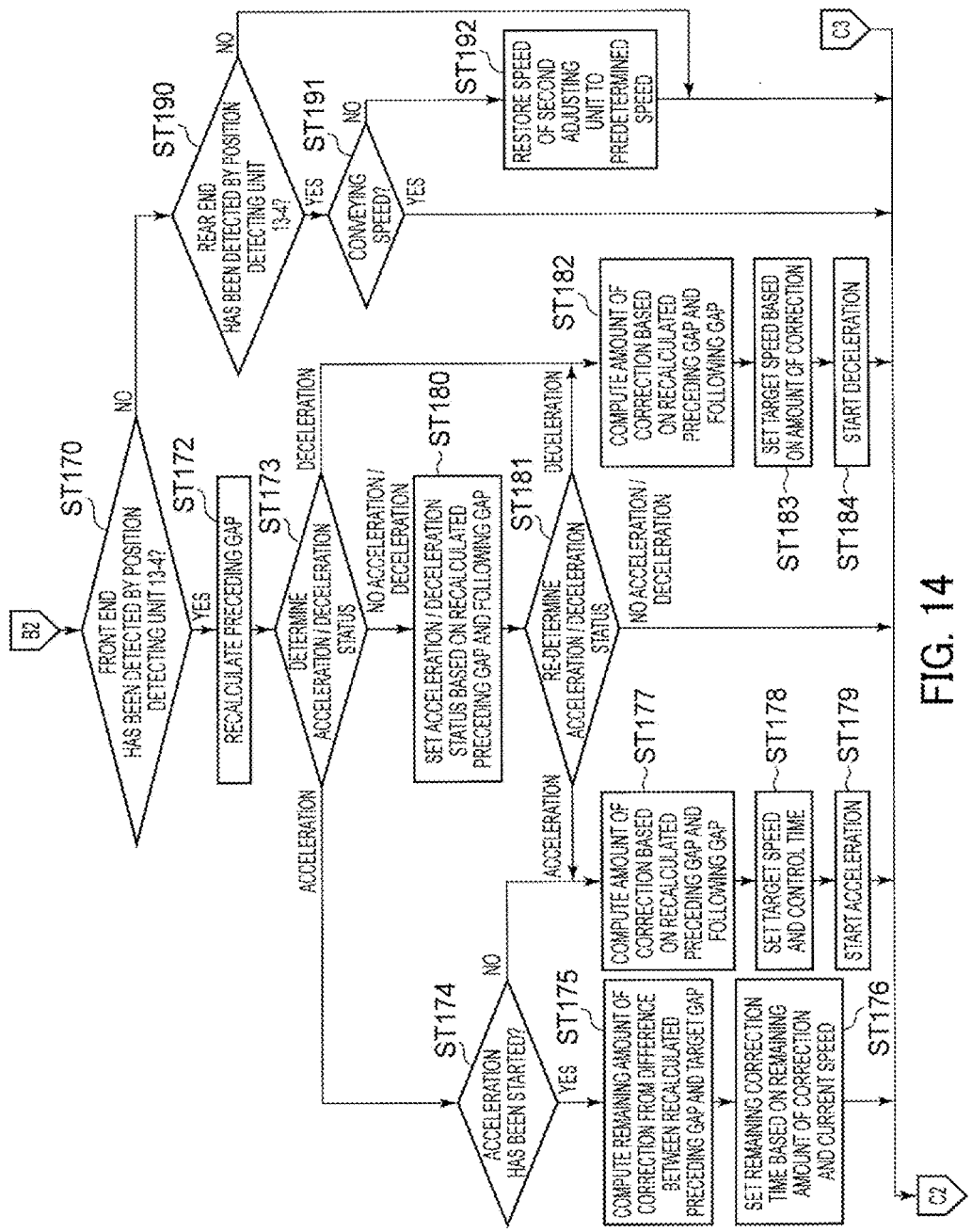
FIG. 14 is a flowchart illustrating the operation of the gap correction unit 9A according to the second embodiment.
Figure 15:
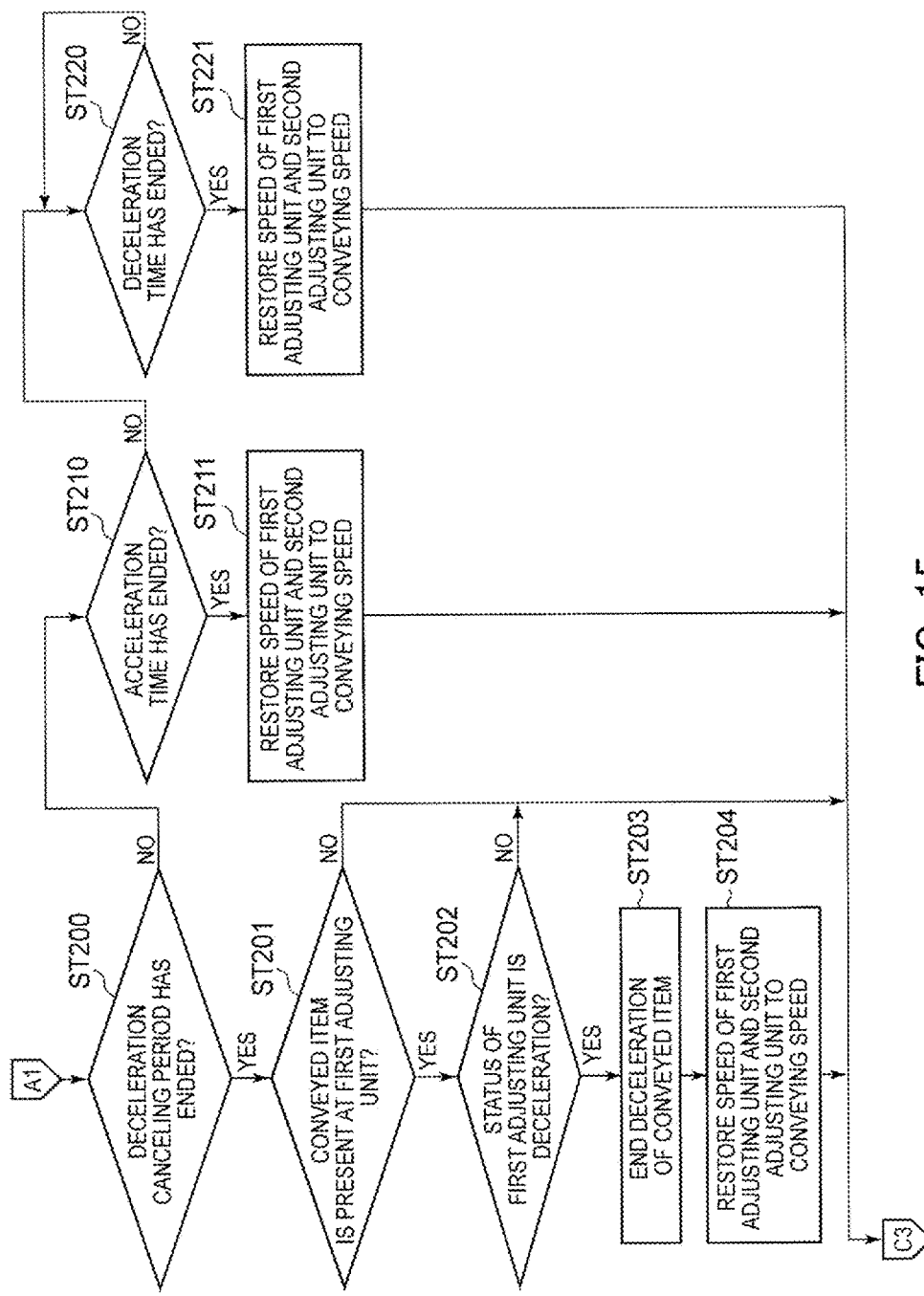
FIG. 15 is a flowchart illustrating the operation of the gap correction unit 9A according to the second embodiment.

As shown in FIG. 12, the control device 10 determines whether or not a signal indicating that a predetermined period has elapsed has been input from an internal timer (step ST100). That is to say, the control device 10 determines whether or not the predetermined period has elapsed. If the signal has been input from the internal timer, the control device 10 advances the processing to step ST200 onward in FIG. 15, and if the signal output by the timer has not been input, the control device 10 advances the processing to step ST102.

The control device 10 determines whether or not a conveyed item S has been detected by the conveyed item position detecting unit 13 (step ST102). If a conveyed item S has not been detected by the conveyed item position detecting unit 13, the control device 10 returns the processing to step ST100.

If a signal is supplied from the conveyed item position detecting unit 13 as a result of detecting a conveyed item S with the conveyed item position detecting unit 13, the control device 10 determines whether or not the front end position of the conveyed item S in the conveying direction has been detected by the position detecting unit 13-1, based on the signal detected by the conveyed item position detecting unit 13 (step ST110).

If it is determined that the front end position of the conveyed item S in the conveying direction has been detected by the position detecting unit 13-1, the control device 10 acquires, from the gap detecting unit 11, a conveyed item number and the gap preceding and the gap following the conveyed item S whose front end position in the conveying direction has been detected in step ST110 (step ST111). It should be noted that the conveyed item number is information for identifying the conveyed item S from other conveyed items.

The control device 10 determines whether or not the conveyed item S detected by the position detecting unit 13-1 is a first conveyed item since the operation of the conveying apparatus 1 was started, based on the information acquired by the gap detecting unit 11 (step ST112).

If it is determined that the conveyed item S is not the first conveyed item, the control device 10 adds the amount of correction for a preceding conveyed item of the conveyed item S to the preceding gap of the conveyed item S acquired in step ST111 (step ST113), and advances the processing to step ST114. If it is determined that the conveyed item S is the first conveyed item, or if the processing in step S113 has been performed, the control device 10 computes the amount of correction for the conveyed item S (item subject to conveyance) based on the preceding gap and the following gap that are acquired in step ST111, and computes a target gap based on the computed amount of correction (step ST114). For example, the control device 10 computes a correction value and the target gap such that the gap preceding and the gap following the conveyed item S are uniformly distributed.

Assuming that the gap preceding the conveyed item S is A, the gap following the conveyed item S is B, and the amount of correction for the preceding conveyed item is ΔLn−1, the amount of correction ΔLn for the conveyed item S is indicated by Expression (5) below. The amount of correction ΔLn−1 for the preceding conveyed item is a positive value in the case of acceleration, and is a negative value in the case of deceleration. Thus, the control device 10 calculates the amount of correction ΔLn based on the amount of correction for the preceding conveyed item and the preceding gap of the preceding conveyed item S regarding which an acceleration/deceleration status is considered.

The acceleration/deceleration status indicates an operation status of each of the first adjusting unit 16 and the second adjusting unit 17, and is any one of an accelerating operation of accelerating the conveyed item S, a decelerating operation of decelerating the conveyed item S, and a non-accelerating/deceleration operation of conveying the conveyed item S at the conveying speed of the conveying unit 4.

$$\Delta Ln = \{(A \pm \Delta Ln-1) - B^*\}/2 \quad (5)$$

Next, the control device 10 sets the acceleration/deceleration status of the conveyed item S based on the computed amount of correction ΔLn for the conveyed item S (step ST115). The control device 10 sets the acceleration/deceleration status to "acceleration" if the amount of correction ΔLn is smaller than 0, sets the acceleration/deceleration status to "deceleration" if the amount of correction ΔLn is larger than 0, and sets the acceleration/deceleration status to "no acceleration/deceleration" if the amount of correction ΔLn is 0.

Next, the control device 10 sets a deceleration canceling period for the conveyed item S, and starts to take the deceleration canceling period (step ST116). The deceleration canceling period refers to a period for canceling the decelerating operation of the first adjusting unit 16 and restoring the speed of the first adjusting unit 16 to the conveying speed of the conveying unit 4 before the conveyed item S reaches the first adjusting unit 16. The deceleration canceling period is set in order to avoid a decrease in the quality of the conveyed item S as a result of the conveyed item S that has passed through the position detecting unit 13-1 being conveyed to the first adjusting unit 16 while it is performing the decelerating operation. The deceleration canceling period is set to a shorter period than a period that is determined based on the distance from the position in the conveying direction Y at which the position detecting unit 13-1 is provided to the position at which the conveyed item S is held by the first adjusting unit 16, and the conveying speed of the conveying unit 4. Thus, in the case of decelerating the conveyed item S with the first adjusting unit 16, the control device 10 stops the deceleration of the conveyed item S with the first adjusting unit 16 before the following conveyed item arrives. The control device 10 starts the deceleration canceling period, and returns the processing to step ST100.

If it is not determined in step ST110 that the front end position of the conveyed item S in the conveying direction has been detected by the position detecting unit 13-1, the control device 10 determines whether or not the rear end position of the conveyed item S in the conveying direction has been detected by the position detecting unit 13-1 (step ST120). If it is determined that the rear end position of the conveyed item S in the conveying direction has been detected by the position detecting unit 13-1, the control device 10 returns the processing to step ST100.

Figures 16, 17:
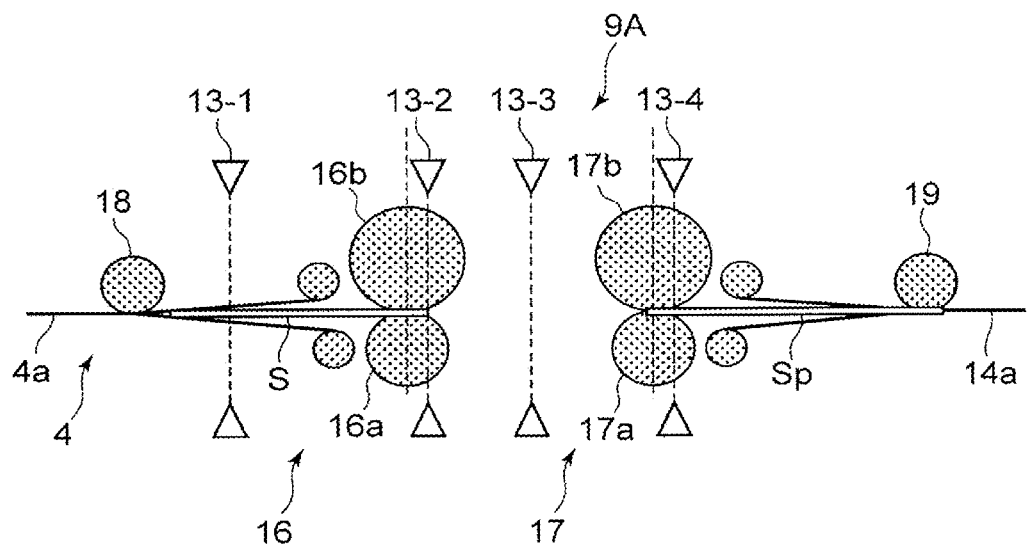
FIG. 16 is a diagram showing a state where a front end position of a conveyed item S in a conveying direction has reached a position detecting unit 13-2 according to the second embodiment.
FIG. 17 is a diagram showing a relationship between the amount of correction, the speed of the conveyed item S, and acceleration/deceleration control time according to the second embodiment.

If it is determined in step ST120 that the rear end position of the conveyed item S in the conveying direction has not been detected by the position detecting unit 13-1, the control device 10 determines whether or not the front end position of the conveyed item S in the conveying direction has been detected by the position detecting unit 13-2 (step ST130). FIG. 16 is a diagram showing a state where the conveyed item S has reached the position detecting unit 13-2 according to the second embodiment. If the conveyed item S has reached the position detecting unit 13-2, there are two cases, namely the case where a preceding conveyed item Sp is held by the second adjusting unit 17 as shown in FIG. 16, and the case where the preceding conveyed item Sp is not held by the second adjusting unit 17. Returning to FIG. 12, if it is determined that the front end position of the conveyed item S in the conveying direction has been detected by the position detecting unit 13-2, the control device 10 advances the processing to step ST131, and if it is determined that the front end position of the conveyed item Sin the conveying direction has not been detected by the position detecting unit 13-2, the control device 10 advances the processing to step ST140.

If it is determined in step ST130 that the front end position of the conveyed item S in the conveying direction has been detected by the position detecting unit 13-2, the control device 10 determines the acceleration/deceleration status that is set for the conveyed item S (step ST131), and if the acceleration/deceleration status is "acceleration", the control device 10 determines whether or not a preceding conveyed item Sp is present at the second adjusting unit 17 (step ST132). If the preceding conveyed item Sp is held at the second adjusting unit 17 as shown in FIG. 16, the control device 10 determines that the preceding conveyed item Sp is present with respect to the conveyed item S. If the acceleration/deceleration status is "deceleration" or "no acceleration/deceleration", the control device 10 returns the processing to step ST100.

If it is determined in step ST132 that no preceding conveyed item Sp is present at the second adjusting unit 17, the control device 10 sets the target speed of the conveyed item S based on the amount of correction ΔLn (step ST133).

FIG. 17 is a diagram showing a relationship between the amount of correction ΔL, the target speed of the conveyed item S, and control time for acceleration and deceleration according to the second embodiment. The target speed of the conveyed item S is the speed after acceleration or the speed after deceleration that corresponds to the amount of correction ΔL, and the control time is the time during which the conveyed item S is conveyed at the speed after acceleration or the speed after deceleration from the conveying speed of the conveying unit 4. The control device 10 stores table data in which the relationship is described as shown in FIG. 17 in a storage unit (not shown). Before starting acceleration of the conveyed item S, the control device 10 reads out the speed and the control time for the conveyed item S that corresponds to the computed amount of correction ΔL, and sets the read speed to the target speed.

After setting the target speed of the conveyed item S, the control device 10 starts acceleration of the conveyed item S by controlling the rotation speed of the first adjusting unit 16 such that the speed of the conveyed item S is the target speed of the conveyed item S which is set in step ST133 (step ST134). At this time, the control device 10 sets the control time that corresponds to the amount of correction ΔL as the acceleration time.

If it is determined in step ST130 that the front end position of the conveyed item S in the conveying direction has not been detected by the position detecting unit 13-2, the control device 10 determines whether or not the rear end position of the conveyed item S in the conveying direction has been detected by the position detecting unit 13-2 (step ST140).

Figure 18:
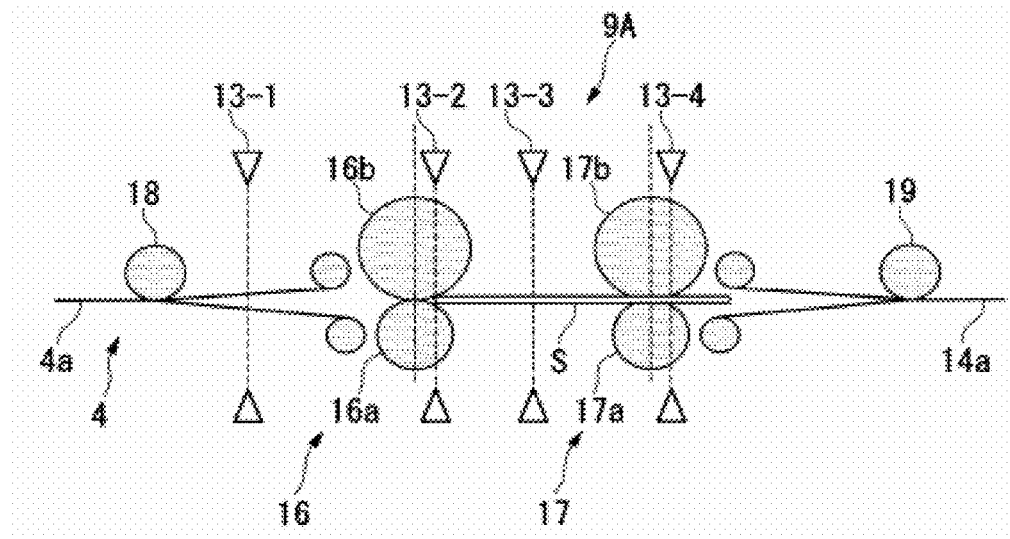
FIG. 18 is a diagram showing a state where a rear end position of the conveyed item S in the conveying direction has reached the position detecting unit 13-2 according to the second embodiment.

FIG. 18 is a diagram showing a state where the rear end position of the conveyed item S in the conveying direction has reached the position detecting unit 13-2 according to the second embodiment. As shown in the diagram, if the rear end position of the conveyed item S in the conveying direction reaches the position detecting unit 13-2, the conveyed item S is in a state of having gone through the first adjusting unit 16 in the Y direction and being held by the second adjusting unit 17.

If it is determined in step ST140 that the rear end position of the conveyed item S in the conveying direction has been detected by the position detecting unit 13-2, the control device 10 determines whether or not the speed of the conveyed item S is the conveying speed of the conveying unit 4 (step ST141). If it is determined that the speed of the conveyed item S is the conveying speed of the conveying unit 4, the control device 10 returns the processing to step ST100. On the other hand, if it is determined that the speed of the conveyed item S is not the conveying speed of the conveying unit 4, the control device 10 returns the speed of conveying the conveyed item S with the first adjusting unit 16 to the conveying speed of the conveying unit 4 (step ST142), and returns the processing to step ST100.

Figure 19:
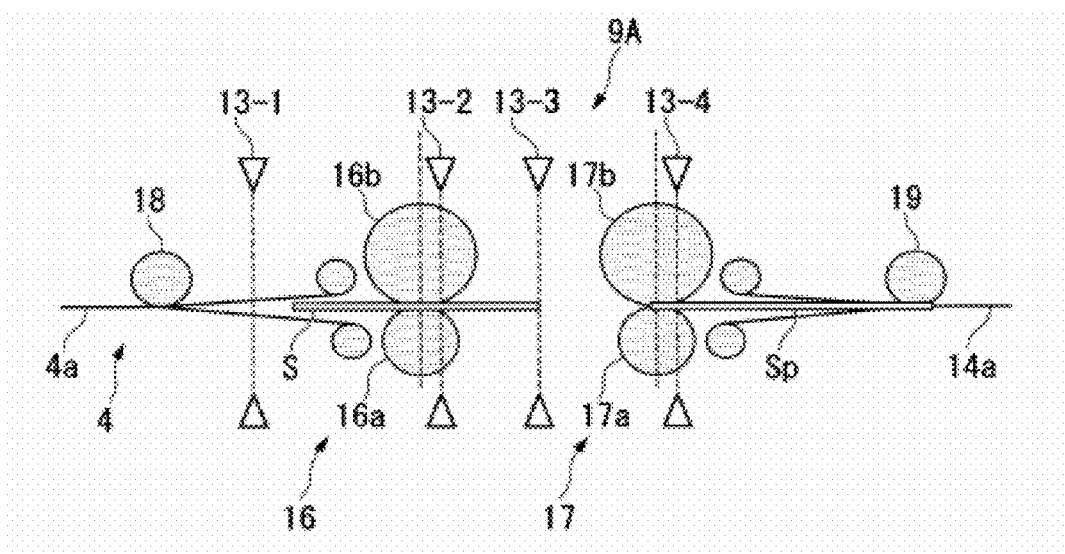
FIG. 19 is a diagram showing a state where the front end position of the conveyed item S in the conveying direction has reached a position detecting unit 13-3 according to the second embodiment.

If it is determined in step ST140 that the rear end position of the conveyed item S in the conveying direction has not been detected by the position detecting unit 13-2, the control device 10 determines whether or not the front end position of the conveyed item S in the conveying direction has been detected by the position detecting unit 13-3 (step ST150). FIG. 19 is a diagram showing a state where the front end position of the conveyed item S in the conveying direction has reached the position detecting unit 13-3 according to the second embodiment. If the front end position of the conveyed item S in the conveying direction has reached the position detecting unit 13-3, there are two cases, namely the case where the preceding conveyed item Sp is held by the second adjusting unit 17 as shown in FIG. 19, and the case where the preceding conveyed item Sp is not held by the second adjusting unit 17.

If it is determined in step ST150 that the front end position of the conveyed item S in the conveying direction has been detected by the position detecting unit 13-3, the control device 10 determines the acceleration/deceleration status that is set for the conveyed item S (step ST151). If the acceleration/deceleration status is "deceleration" or "no acceleration/deceleration", the control device 10 returns the processing to step ST100.

If it is determined in step ST151 that the acceleration/deceleration status is "acceleration", the control device 10 determines whether or not the acceleration of the conveyed item S with the first adjusting unit 16 has not been started (step ST152). If the acceleration of the conveyed item S has not been started, the control device 10 returns the processing to step ST100.

If it is determined in step ST152 that the acceleration of the conveyed item S has been started, the control device 10 determines whether or not a preceding conveyed item Sp is present at the second adjusting unit 17 (step ST153). If the preceding conveyed item Sp is held at the second adjusting unit 17 as shown in FIG. 19, the control device 10 determines that a preceding conveyed item Sp is present with respect to the conveyed item S, and returns the processing to step ST100.

If it is determined that no preceding conveyed item Sp is present at the second adjusting unit 17, the control device 10 starts the acceleration of the conveyed item S by increasing the rotation speed of the first adjusting unit 16 (step ST154). At this time, the control device 10 sets the control time that corresponds to the amount of correction ΔL as the acceleration time.

If it is determined in step ST150 that the front end position of the conveyed item S in the conveying direction has not been detected by the position detecting unit 13-3, the control device 10 determines whether or not the rear end position of the conveyed item S in the conveying direction has been detected by the position detecting unit 13-3 (step ST160).

Figure 20:
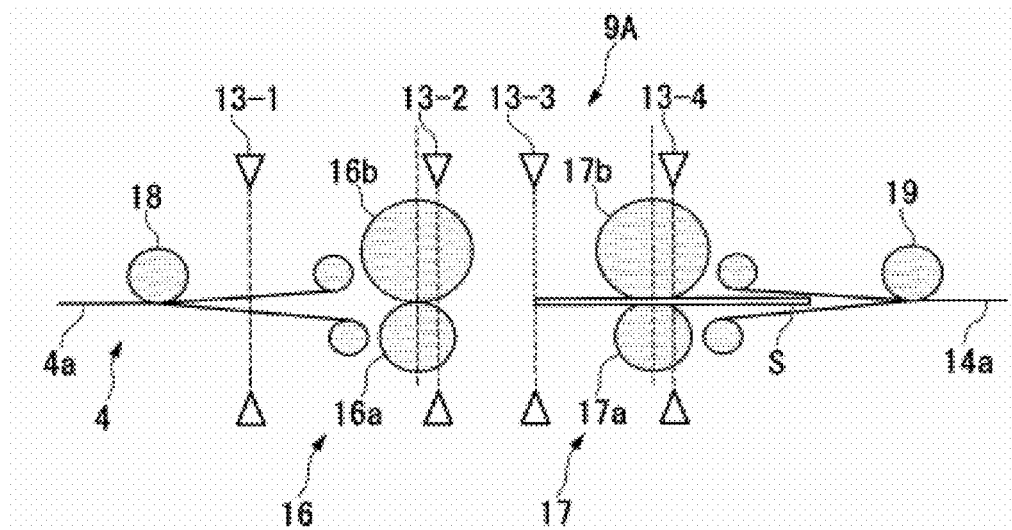
FIG. 20 is a diagram showing a state where the rear end position of the conveyed item S in the conveying direction has reached the position detecting unit 13-3 according to the second embodiment.

FIG. 20 is a diagram showing a state where the rear end position of the conveyed item S in the conveying direction has reached the position detecting unit 13-3 according to the second embodiment. If the rear end position of the conveyed item S in the conveying direction reaches the position detecting unit 13-3, the conveyed item S is in a state of having gone through the first adjusting unit 16 in the Y direction and being held by the second adjusting unit 17. If it is determined that the rear end position of the conveyed item S in the conveying direction has been detected by the position detecting unit 13-3, the control device 10 returns the processing to step ST100.

If it is determined in step ST160 that the rear end position of the conveyed item S in the conveying direction has not been detected by the position detecting unit 13-3, the control device 10 determines whether or not the front end position of the conveyed item S in the conveying direction has been detected by the position detecting unit 13-4 (step ST170).

If it is determined in step ST170 that the front end position of the conveyed item S in the conveying direction has been detected by the position detecting unit 13-4, the second gap detecting unit 11A recalculates the preceding gap (second preceding gap) of the conveyed item S at the timing of detecting the front end position of the conveyed item S, which has reached the position detecting unit 13-4, in the conveying direction (step ST172).

Figure 21:
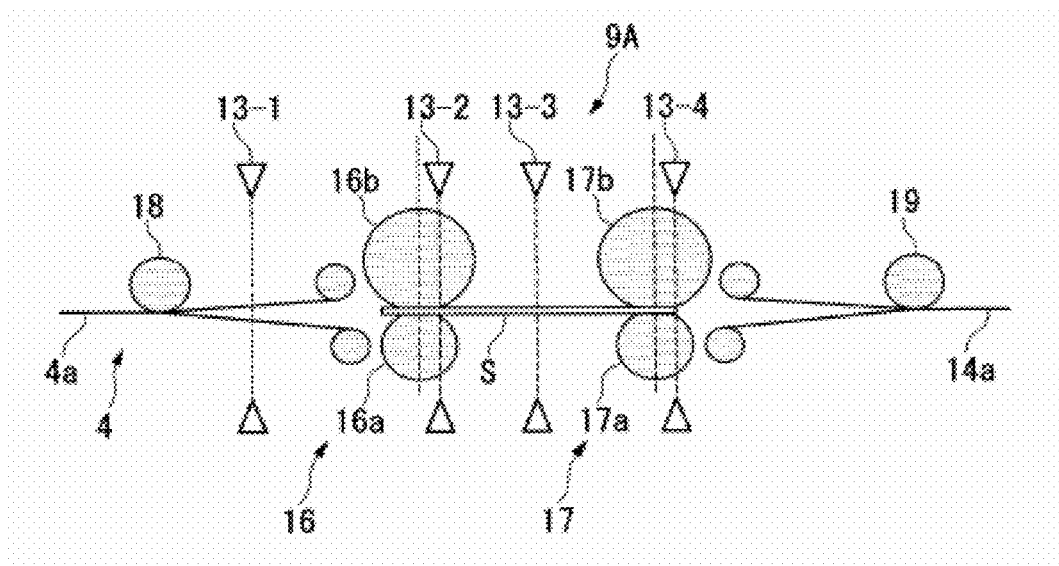
FIG. 21 is a diagram showing a state where the front end position of the conveyed item S in the conveying direction has reached a position detecting unit 13-4 according to the second embodiment.

FIG. 21 is a diagram showing a state where the front end position of the conveyed item S in the conveying direction has reached the position detecting unit 13-4 according to the second embodiment. In the second embodiment, the distance between the first adjusting unit 16 and the second adjusting unit 17 in the conveying direction Y is set shorter than the length of the shortest conveyed item S in the conveying apparatus 1, for example. For this reason, if the front end position of the conveyed item S in the conveying direction reaches the position detecting unit 13-4, the conveyed item S is held by both the first adjusting unit 16 and the second adjusting unit 17. For example, the second gap detecting unit 11A recalculates the preceding gap of the conveyed item S based on a time difference between the time when the preceding conveyed item Sp with respect to the conveyed item S reaches the second gap detecting unit 11A and the time when the conveyed item S reaches the second gap detecting unit 11A, as well as the conveying speed of the conveying unit 4.

Next, the control device 10 determines the acceleration/deceleration status that is set for the conveyed item S (step ST173), advances the processing to step ST174 if the acceleration/deceleration status is "acceleration", advances the processing to step ST180 if the acceleration/deceleration status is "no acceleration/deceleration", and advances the processing to step ST182 if the acceleration/deceleration status is "deceleration".

If the acceleration/deceleration status is "acceleration", the control device 10 determines whether or not the acceleration of the conveyed item S has been started (step ST174). If the acceleration of the conveyed item S has been started, the control device 10 computes the remaining amount of correction from the difference between the recalculated preceding gap (second preceding gap) and the target gap (step ST175). Next, the control device 10 computes remaining correction time based on the computed remaining amount of correction and the current speed of the conveyed item S (target speed) (step ST176).

Figure 22:
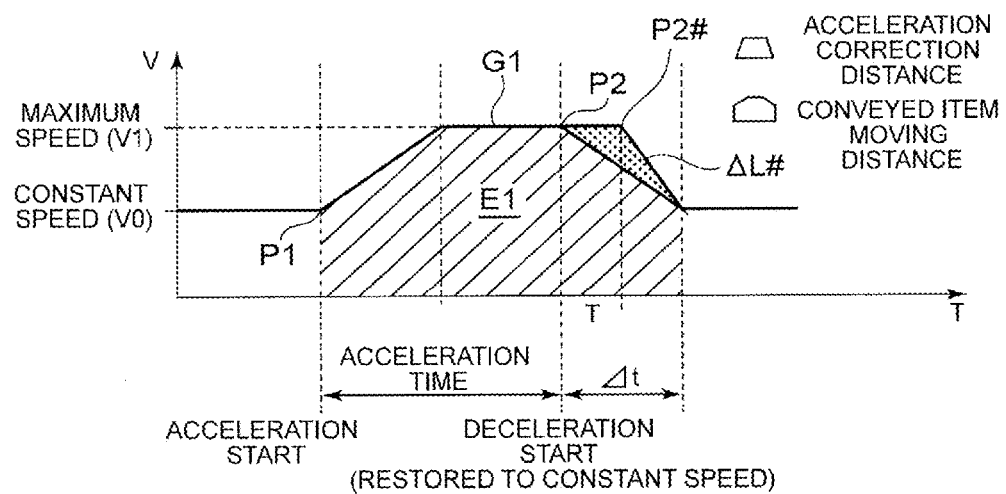
FIG. 22 is a diagram illustrating the operation for adjusting acceleration control time according to the second embodiment.

FIG. 22 is a diagram illustrating an operation for adjusting acceleration control time according to the second embodiment. If the remaining amount of correction is $\Delta L\#$, the control device 10 sets a time $\Delta t$, which is obtained by delaying deceleration start time P2 of the conveyed item S by time T, so as to advance the conveyed item S by the remaining amount of correction $\Delta L\#$. Thus, the control device 10 adjusts the preceding gap so as to narrow this preceding gap by the remaining amount of correction $\Delta L\#$ by lengthening the acceleration time for controlling the speed of the conveyed item S from the conveying speed (V0) to the maximum speed (V1). After lengthening the acceleration time of the conveyed item S, the control device 10 returns the processing to step ST100.

Although, in the second embodiment, the remaining correction time is set based on the difference between the recalculated preceding gap and the target gap, the configuration is not limited thereto. The second embodiment may have a configuration in which not only the preceding gap but also the following gap are detected by the second gap detecting unit 11A, and the remaining correction time is set so as to equalize the preceding gap and the following gap. Although, in the second embodiment, the remaining correction time is adjusted based on the remaining amount of correction, the configuration is not limited thereto. The conveying speed of the conveyed item S may be readjusted. If the conveyed item S is relatively thick, the control device 10 may reaccelerate the conveyed item S based on the remaining amount of correction, for example.

If it is determined in step ST174 that the acceleration of the conveyed item S has not been started, or if the conveyed item S is accelerated as a result of re-determining the acceleration/deceleration status in later-described step ST181, the control device 10 computes the amount of correction $\Delta L$ using Expression (1) based on the preceding gap recalculated by the second gap detecting unit 11A and the following gap (step ST177). Next, the control device 10 sets the target speed and the control time for the conveyed item S based on the computed amount of correction $\Delta L$ (step ST178). The control device 10 sets the target speed and the control time for the conveyed item S by referencing the table data shown in FIG. 17, for example. Then, the control device 10 starts the acceleration of the conveyed item S by controlling the rotation speed of the first adjusting unit 16 such that the speed of the conveyed item S is the target speed of the conveyed item S that is set in step ST178 (step ST179). At this time, the control device 10 sets the control time that corresponds to the amount of correction $\Delta L$ as the acceleration time.

If it is determined in step ST173 that the acceleration/deceleration status is "no acceleration/deceleration", the control device 10 sets the acceleration/deceleration status based on the preceding gap recalculated in step ST172 and the following gap acquired from the gap detecting unit 11 (step ST180). The control device 10 sets the acceleration/deceleration status by computing the amount of correction $\Delta L$ using Expression (1) based on the recalculated preceding gap and the following gap. Next, the control device 10 re-determines the acceleration/deceleration status based on the result of the setting in step ST180 (step ST181). If the acceleration/deceleration status is "acceleration", the control device 10 advances the processing to step ST177. If the acceleration/deceleration status is "no acceleration/deceleration", the control device 10 returns the processing to step ST100. If the acceleration/deceleration status is "deceleration", the control device 10 advances the processing to step ST182.

If it is determined in step ST173 or step ST181 that the acceleration/deceleration status is "deceleration", the control device 10 computes the amount of correction $\Delta L$ using Expression (1) based on the preceding gap recalculated by the second gap detecting unit 11A, and the following gap (step ST182). Next, the control device 10 sets the target speed and the control time for the conveyed item S based on the computed amount of correction ΔL (step ST183). The control device 10 sets the target speed and the control time for the conveyed item S by referencing the table data shown in FIG. 17, for example. Then, the control device 10 starts the deceleration of the conveyed item S by controlling the rotation speed of the first adjusting unit 16 such that the speed of the conveyed item S is the target speed of the conveyed item S that is set in step ST183 (step ST184). At this time, the control device 10 sets the control time that corresponds to the amount of correction ΔL as the deceleration time.

It should be noted that the control device 10 may omit the processing in step ST182 if the conveyed item S is decelerated based on the preceding gap and the following gap detected by the gap detecting unit 11. Furthermore, in the second embodiment, the deceleration of the conveyed item S is started if the front end position of the conveyed item S in the conveying direction has reached the position detecting unit 13-4. However, the configuration is not limited thereto. The deceleration of the conveyed item S may be started if the front end position of the conveyed item S in the conveying direction has reached the position detecting unit 13-2, or if the front end position of the conveyed item S in the conveying direction has reached the position detecting unit 13-3.

If it is determined in step ST170 that the front end position of the conveyed item S in the conveying direction has not been detected by the position detecting unit 13-4, the control device 10 determines whether or not the rear end position of the conveyed item S in the conveying direction has been detected by the position detecting unit 13-4 (step ST190).

Figure 23:
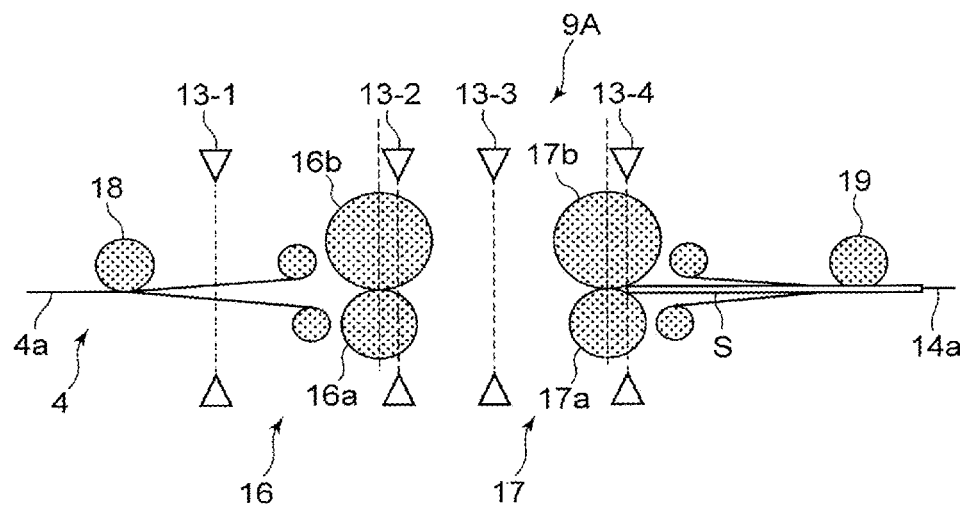
FIG. 23 is a diagram showing a state where the rear end position of the conveyed item S in the conveying direction has reached the position detecting unit 13-4 according to the second embodiment.

FIG. 23 is a diagram showing a state where the rear end position of the conveyed item S in the conveying direction has reached the position detecting unit 13-4 according to the second embodiment. If the rear end position of the conveyed item S in the conveying direction reaches the position detecting unit 13-4, the conveyed item S is in a state of having gone through the second adjusting unit 17 in the Y direction. If it is determined that the rear end position of the conveyed item S in the conveying direction has been detected by the position detecting unit 13-4, the control device 10 advances the processing to step ST191. If it is determined that the rear end position of the conveyed item S in the conveying direction has not been detected by the position detecting unit 13-4, the control device 10 returns the processing to step ST100.

If it is determined in step ST190 that the rear end position of the conveyed item S in the conveying direction has been detected by the position detecting unit 13-4, the control device 10 determines whether or not the speed of the conveyed item S at the first adjusting unit 16 and the second adjusting unit 17 is the conveying speed of the conveying unit 4 (step ST191). If it is determined that the speed of the conveyed item S at the first adjusting unit 16 and the second adjusting unit 17 is the conveying speed of the conveying unit 4, the control device 10 returns the processing to step ST100. If it is determined that the speed of the conveyed item S is not the conveying speed of the conveying unit 4, the control device 10 restores the speed of conveying the conveyed item S using the second adjusting unit 17 to the conveying speed of the conveying unit 4 (step ST192), and returns the processing to step ST100.

If it is determined in step ST100 that the signal has been input from the internal timer, the control device 10 determines in step ST200 whether or not the deceleration canceling period has ended (step ST200). If it is determined that the deceleration canceling period has ended, the control device 10 advances the processing to step ST201, and if it is determined that the deceleration canceling period has not ended, the control device 10 advances the processing to step ST210.

If it is determined in step ST200 that the deceleration canceling period has ended, the control device 10 determines whether or not the preceding conveyed item Sp is present at the first adjusting unit 16 (step ST201). If the preceding conveyed item Sp is not present at the first adjusting unit 16, the control device 10 returns the processing to step ST100. If the preceding conveyed item Sp is present at the first adjusting unit 16, the control device 10 determines whether or not the acceleration/deceleration status of the first adjusting unit 16 is "deceleration" (step ST202). If it is determined that the acceleration/deceleration status is not "deceleration", the control device 10 returns the processing to step ST100. If it is determined that the acceleration/deceleration status of the first adjusting unit 16 is "deceleration", the control device 10 ends the operation of decelerating the conveyed item S (step ST203), and the conveying speed of the conveyed item S at the first adjusting unit 16 and the second adjusting unit 17 is restored to the conveying speed of the conveying unit 4 (step ST204). It should be noted that if the control device 10 is performing control so as to simultaneously accelerate or decelerate both the first adjusting unit 16 and the second adjusting unit 17, the control device 10 may make the determination by referencing both acceleration/deceleration statuses that are set for the first adjusting unit 16 and the second adjusting unit 17.

If it is determined in step ST200 that the deceleration canceling period has not ended, the control device 10 determines whether or not the acceleration time has ended (ST210). If it is determined that the acceleration time has ended, the control device 10 restores the conveying speed of the conveyed item S at the first adjusting unit 16 and the second adjusting unit 17 to the conveying speed of the conveying unit 4 (step ST211). If the acceleration time has not ended, the control device 10 determines whether or not the deceleration time has ended (step ST220). If it is determined that the deceleration time has ended, the control device 10 restores the conveying speed of the conveyed item S at the first adjusting unit 16 and the second adjusting unit 17 to the conveying speed of the conveying unit 4 (step ST221).

As described above, the second embodiment includes the second gap detecting unit 11A that is provided in the second adjusting unit 17 downstream from the first adjusting unit 16 and the second adjusting unit 17. The conveying speed of the conveyed item S is controlled based on the preceding gap and the following gap that are detected by the gap detecting unit 11. Furthermore, the conveyance of the conveyed item S is controlled based on the preceding gap detected by the second gap detecting unit 11A. With this configuration, according to the second embodiment, the conveyance of the conveyed item S can be adjusted based on the result of the detection performed by the second gap detecting unit 11A if the control of the conveyed item S that is based on the result of the detection performed by the gap detecting unit 11 is not performed as expected. For example, a conveyance delay of the conveyed item S is likely to occur with respect to the preceding conveyed item Sp if the conveyed item S is relatively thick, and there are cases where a conveyance error occurs even if the preceding gap and the following gap are equally controlled based on the result of the detection performed by the gap detecting unit 11. On the other hand, according to the second embodiment, even if the preceding gap is not narrowed as defined by the amount of correction when the acceleration is performed based on the result of the detection performed by the gap detecting unit 11, the preceding gap can be adjusted by readjusting the conveyance of the conveyed item S based on the result of the detection performed by the second gap detecting unit 11A.

According to the second embodiment, if the conveyed item S is accelerated based on the result of the detection performed by the gap detecting unit 11, the remaining time for accelerating the conveyed item S is set based on the preceding gap detected by the second gap detecting unit 11A. Therefore, a conveyance error can be further reduced by correcting the amount of correction that is based on the result of the detection performed by the gap detecting unit 11. Furthermore, according to the second embodiment, if the conveyed item S is not being accelerated based on the result of the detection performed by the gap detecting unit 11, the conveyed item S can be accelerated based on the second preceding gap detected by the second gap detecting unit 11A and the following gap detected by the gap detecting unit 11. Even if it is determined based on the result of the detection performed by the gap detecting unit 11 that a conveyance error has not occurred, the conveyance error can be reduced based on the result of the detection performed by the second gap detecting unit 11A.

According to the second embodiment, when not decelerating the conveyed item S based on the result of the detection performed by the gap detecting unit 11, the deceleration of the conveyed item S is started based on the preceding gap detected by the second gap detecting unit 11A. Therefore, even if it is determined based on the result of the detection performed by the gap detecting unit 11 that a conveyance error has not occurred, the conveyance error can be reduced based on the result of the detection performed by the second gap detecting unit 11A. Furthermore, according to the second embodiment, even if the conveyed item S is decelerated based on the result of the detection performed by the gap detecting unit 11, the deceleration of the conveyed item S is started based on the preceding gap detected by the second gap detecting unit 11A. Therefore, the conveyance error can be reduced based on the result of the detection performed by the second gap detecting unit 11A.

According to the second embodiment, the acceleration of the conveyed item S is started based on the result of the detection performed by the gap detecting unit 11 if the conveyed item S has reached the first adjusting unit 16 and the preceding conveyed item Sp is not present at the second adjusting unit 17. Furthermore, according to the second embodiment, the acceleration of the conveyed item S is started based on the result of the detection performed by the gap detecting unit 11 if the conveyed item S has reached a position between the first adjusting unit 16 and the second adjusting unit 17 and the preceding conveyed item Sp is not present at the second adjusting unit 17. With this configuration, according to the second embodiment, control can be performed for narrowing the preceding gap of the conveyed item S compared with the case of starting the acceleration if the conveyed item S has reached the second adjusting unit 17.

According to at least one of the above-described embodiments, the gap correction unit 9 includes the two adjusting units 16 and 17 as the speed adjusting unit 12. Moreover, the adjusting units 16 and 17 are provided with the position detecting units 13a and 13b, respectively. The acceleration/deceleration speeds at the two adjusting units 16 and 17 are individually controlled based on the result of the detection of the gap detecting unit 11 and the result of the detection of the position detecting units 13a and 13b. Therefore, the gap preceding and the gap following the conveyed item can be corrected regardless of the length of the conveyed item. Accordingly, it is possible to appropriately maintain the quality of the conveyed item without exerting an excessive stress on the conveyed item.

Although some embodiments of the present invention have been described, these embodiments are proposed as examples, and are not intended to limit the scope of the invention. These embodiments can be carried out in various other modes, and omission, replacement, and modification can be made in various forms without departing from the gist of the invention. The embodiments and modifications thereof are encompassed in the scope and the gist of the invention, and are also encompassed in the invention described in the claims and the equivalents thereof.

What is claimed is:

1. A conveying apparatus comprising:
   a conveyor configured to convey a conveyed item at a predetermined speed;
   a first gap detector provided midway in the conveyor, the first gap detector being configured to detect a first preceding gap between the conveyed item and a preceding conveyed item that is conveyed immediately before the conveyed item, and a following gap between the conveyed item and a following conveyed item that is conveyed immediately behind the conveyed item;
   at least two speed adjusters provided midway in the conveyor downstream from the first gap detector, the speed adjusters being configured to adjust a conveying speed of the conveyed item;
   at least two conveyed item position detectors, one of the conveyed item position detectors being provided for each of the speed adjusters, the conveyed item position detectors being configured to detect a position that a front end position of the conveyed item in the conveying direction has reached and a position that a rear end position of the conveyed item in the conveying direction has reached with respect to the corresponding speed adjuster; and
   a controller configured to individually control a conveying speed of the conveyed item at each of the speed adjusters based on a result of the detection performed by the first gap detector and a result of the detection performed by the conveyed item position detectors.

2. The apparatus according to claim 1,
   wherein the conveyor includes a conveying roller,
   each of the speed adjusters includes a pair of speed correction rollers configured to hold and convey the conveyed item,
   assuming that L1 is a distance, in the conveying direction, between a rotation center of the conveying roller arranged immediately upstream from the speed adjusters and a rotation center of the pair of speed correction rollers in the most upstream speed adjuster of the plurality of speed adjusters,
   L2 is a distance between a rotation center of the pair of speed correction rollers in a speed adjuster arranged upstream from the two speed adjusters arranged next to each other in the conveying direction and a rotation center of the pair of speed correction rollers in a speed adjuster arranged downstream from the pair of speed correction rollers in the speed adjuster that is arranged upstream, Lmin is a length of a shortest conveyed item having a shortest length in the conveying direction, Lmax is a length of a longest conveyed item having a longest length in the conveying direction, and a1 is a distance with which the shortest conveyed item that is conveyed from the conveying roller arranged immediately upstream from the speed adjuster and has been carried past the conveying roller and separated from the conveying roller can be held and drawn in by the pair of speed correction rollers of the most upstream speed adjuster, then the distances L1 and L2 are set so as to satisfy:

$$a1 \geq L1 \geq L\text{min};$$

$$L2 < L\text{min; and}$$

$$L1 + L2 \geq L\text{max}.$$

3. The apparatus according to claim 1,
wherein the conveyor includes a conveying roller,
each of the speed adjusters includes a pair of speed correction rollers configured to hold and convey the conveyed item,
assuming that L3 is a distance between a rotation center of the pair of speed correction rollers in the speed adjuster that is arranged furthest downstream and a rotation center of a conveying roller arranged immediately downstream from the speed adjuster that is arranged furthest downstream, Lmin is a length of a shortest conveyed item having a shortest length in the conveying direction, Dmax is a conveyed item maximum moving distance by which the conveyed item moves if the conveyed item is maximally accelerated at the speed adjuster arranged furthest downstream, and a2 is a distance with which the shortest conveyed item that is conveyed from the speed adjuster arranged furthest downstream and has been carried past the speed adjuster and separated therefrom can be held and drawn in by a conveying roller arranged immediately downstream from the speed adjuster that is arranged furthest downstream, then the distance L3 is set so as to satisfy:

$$a2 \geq L3 \geq D\text{max}.$$

4. The apparatus according to claim 2,
wherein the conveyed item position detector detects the front end position of the conveyed item in the conveying direction and the rear end position of the conveyed item in the conveying direction at a rotation center position of the pair of speed correction rollers.

5. The apparatus according to claim 2,
wherein one of the pair of speed correction rollers is formed so as to be elastically deformable in accordance with a thickness of the conveyed item.

6. The apparatus according to claim 1,
wherein if the first preceding gap is larger than the following gap, the controller computes a target conveying speed of the speed adjusters that is higher than the predetermined speed.

7. The apparatus according to claim 6,
wherein the controller
computes a conveying speed upper value based on the following gap,
sets the target conveying speed as a determined speed and accelerates the speed adjusters to the determined speed if the target conveying speed is lower than or equal to the conveying speed upper limit value, and
sets the conveying speed upper limit value as the determined speed and accelerates the speed adjusters to the determined speed if the target conveying speed is higher than the conveying speed upper limit value.

8. The apparatus according to claim 6,
wherein two speed adjusters are provided, and
the controller starts acceleration at all of the speed adjusters when the conveyed item position detector detects that the front end position of the conveyed item in the conveying direction has reached a speed adjuster located on the downstream side.

9. The apparatus according to claim 1,
wherein, if the first preceding gap is smaller than the following gap, the controller computes a target conveying speed of the speed adjusters that is smaller than the predetermined speed.

10. The apparatus according to claim 9,
wherein the controller
computes a conveying speed lower limit value based on the following gap,
sets the target conveying speed as a determined speed and decelerates the speed adjusters as the determined speed if the target conveying speed is higher than or equal to the conveying speed lower limit value, and
sets the conveying speed lower limit value as the determined speed and decelerates the speed adjusters to the determined speed if the target conveying speed is lower than the conveying speed lower limit value.

11. The apparatus according to claim 10,
wherein two speed adjusters are provided, and
the controller
computes a deceleration start threshold value based on the first preceding gap,
starts, if the determined speed is higher than or equal to the deceleration start threshold value, deceleration at a speed adjuster located on an upstream side when the rear end position of the conveyed item in the conveying direction separates from the conveyor located upstream from the speed adjuster, and the conveyed item position detector detects that the front end position of the conveyed item in the conveying direction has reached the speed adjuster located on the upstream side, and
starts, if the determined speed is higher than or equal to the deceleration start threshold value, deceleration at a speed adjuster located on a downstream side when the reading end position of the conveyed item in the conveying direction having passed through the speed adjuster located on the downstream side is detected by the conveyed item position detector.

12. The apparatus according to claim 11,
wherein the controller
computes the deceleration start threshold value based on the first preceding gap, and
starts, if the determined speed is lower than the deceleration start threshold value, deceleration at all of the speed adjusters when the conveyed item position detector detects that the front end position of the conveyed item in the conveying direction has reached the speed adjuster located on the downstream side.

13. The apparatus according to claim 1, wherein a second gap detector is provided in a speed adjuster located downstream from two speed adjusters arranged next to each other in the conveying direction, the second gap detector being configured to detect a second preceding gap between the conveyed item and the preceding conveyed item that is conveyed immediately before the conveyed item, and the controller controls the conveying speed of the conveyed item at the speed adjusters based on a result of the detection performed by the first gap detector if the conveyed item position detector has detected that the front end position of the conveyed item in the conveying direction has reached a speed adjuster located upstream from the two speed adjusters, and controls the conveying speed of the conveyed item at the speed adjusters based on a result of the detection performed by the second gap detector if the conveyed item position detector has detected that the front end position of the conveyed item in the conveying direction has reached the speed adjuster located downstream from the two speed adjusters.

14. The apparatus according to claim 13, wherein, if the conveyed item is being accelerated based on the result of the detection performed by the first gap detector, the controller sets remaining time for accelerating the conveyed item based on the second preceding gap detected by the second gap detector.

15. The apparatus according to claim 13, wherein, if the conveyed item is not being accelerated based on the result of the detection performed by the first gap detector, the controller starts acceleration of the conveyed item based on the second preceding gap detected by the second gap detector and the following gap detected by the first gap detector.

16. The apparatus according to claim 13, wherein, if the conveyed item is not decelerated by the speed adjusters based on the result of the detection performed by the first gap detector, the controller starts deceleration of the conveyed item based on the second gap detected by the second gap detector.

17. The apparatus according to claim 13, wherein, if the conveyed item is decelerated by the speed adjusters based on the result of the detection performed by the first gap detector, the controller starts deceleration of the conveyed item based on the second preceding gap detected by the second gap detector in accordance with the conveyed item position detector detecting that the front end position of the conveyed item in the conveying direction has reached the speed adjuster located downstream from the two speed adjusters arranged next to each other in the conveying direction.

18. The apparatus according to claim 13, wherein, if the conveyed item has reached the speed adjuster located on the upstream side and no preceding conveyed item is present at the speed adjuster located on the downstream side, the controller starts acceleration of the conveyed item using the speed adjusters based on the result of the detection performed by the first gap detector.

19. The apparatus according to claim 13, wherein, if the conveyed item has reached any position between the speed adjuster located on the upstream side and the speed adjuster located on the downstream side, and no preceding conveyed item is present at the speed adjuster located on the downstream side, the controller starts acceleration of the conveyed item using the speed adjusters based on the result of the detection performed by the first gap detector.

20. The apparatus according to claim 1, wherein, if the conveyed item is being decelerated by the speed adjusters, the controller stops deceleration of the conveyed item using the speed adjusters before the following conveyed item arrives.

* * * * *